United States Patent
Roh

(10) Patent No.: US 11,016,887 B2
(45) Date of Patent: May 25, 2021

(54) CONVERGED MEMORY DEVICE AND OPERATION METHOD THEREOF

(71) Applicant: SK hynix Inc., Icheon (KR)

(72) Inventor: Wan-Jun Roh, Goyang (KR)

(73) Assignee: SK hynix Inc., Icheon (KR)

( * ) Notice: Subject to any disclaimer, the term of this patent is extended or adjusted under 35 U.S.C. 154(b) by 145 days.

(21) Appl. No.: 16/164,411

(22) Filed: Oct. 18, 2018

(65) Prior Publication Data

US 2019/0129847 A1 May 2, 2019

(30) Foreign Application Priority Data

Oct. 30, 2017 (KR) .................. 10-2017-0142584

(51) Int. Cl.
- *G06F 12/00* (2006.01)
- *G06F 12/0802* (2016.01)
- *G06F 3/06* (2006.01)

(52) U.S. Cl.
CPC .......... *G06F 12/0802* (2013.01); *G06F 3/064* (2013.01); *G06F 3/0604* (2013.01); *G06F 3/0625* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 8,918,576 B2 | 12/2014 | Bert et al. | |
| 8,918,618 B2 | 12/2014 | Fisher et al. | |
| 9,183,917 B1 | 11/2015 | Cho | |
| 9,460,021 B2 | 10/2016 | Hampel et al. | |
| 9,524,771 B2 | 12/2016 | Sriramagiri et al. | |
| 9,703,505 B2 | 7/2017 | Boyle et al. | |
| 2010/0106901 A1 | 4/2010 | Higeta et al. | |
| 2013/0227268 A1 | 8/2013 | Ichida et al. | |
| 2014/0022002 A1 | 1/2014 | Chua-Eoan et al. | |
| 2014/0281311 A1* | 9/2014 | Walker .................. | G06F 12/122 711/162 |
| 2015/0109871 A1 | 4/2015 | Bains et al. | |
| 2016/0162219 A1 | 6/2016 | Erez | |
| 2017/0140810 A1 | 5/2017 | Choi et al. | |
| 2018/0182445 A1 | 6/2018 | Lee et al. | |

OTHER PUBLICATIONS

Notice of Allowance dated Jul. 29, 2020 for U.S. Appl. No. 16/159,479.
Office Action dated Dec. 30, 2019 for related U.S. Appl. No. 16/136,069.
Office Action dated Mar. 5, 2020 for related U.S. Appl. No. 16/159,479.

\* cited by examiner

*Primary Examiner* — Jason W Blust

(57) ABSTRACT

A converged memory device includes: a first memory group having first characteristics; a second memory group having second characteristics that are different from the first characteristics; and a controller configured to migrate predetermined data of the second memory group into a cache region in the first memory group, wherein the controller is further configured to migrate data of the second memory group into the cache region by using the cache region as a buffer when an energy throttling operation is performed on the second memory group.

32 Claims, 18 Drawing Sheets

FIG. 7B
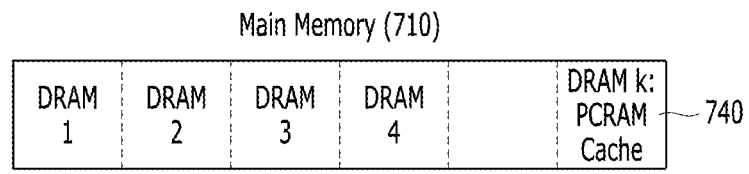
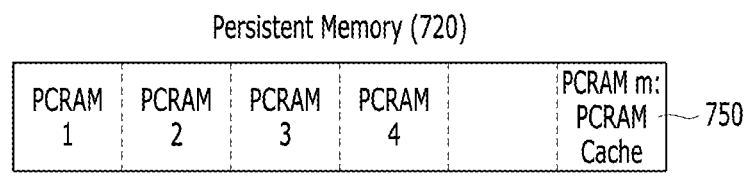
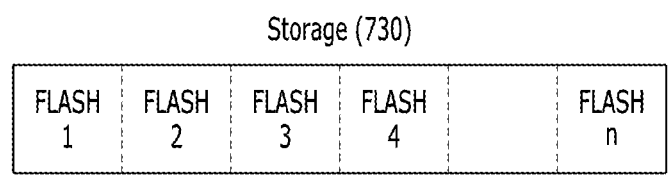
FIG. 7C
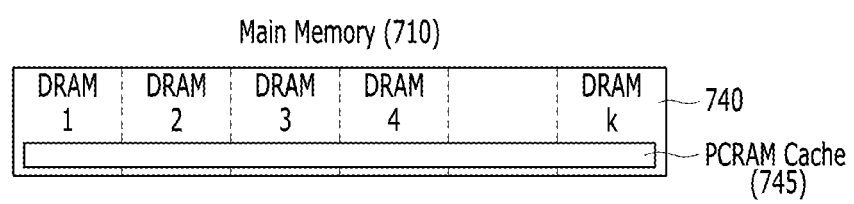
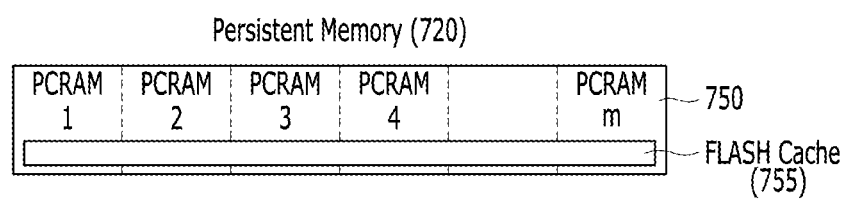
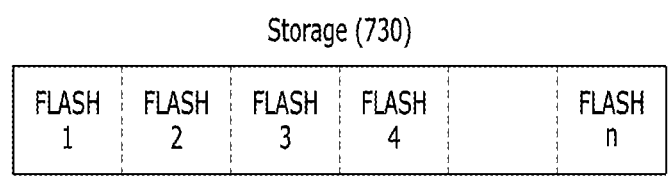

| HA | PA | FREQ | VALID |
|----|----|------|-------|
| 3  | 0  | 100  | 1     |
| 5  | 1  | 50   | 0     |
| 7  | 2  | 200  | 1     |

| PA[0] | PA[1] | PA[2]  | PA[3]  |
|-------|-------|--------|--------|
| PA[4] | PA[5] | PA[6]  | PA[7]  |
| PA[8] | PA[9] | PA[10] | PA[11] |

FIG. 14D
Main Memory
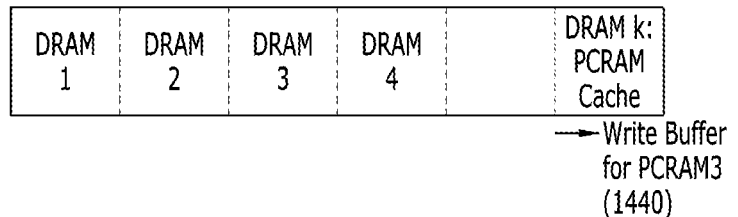
→ Write Buffer for PCRAM3 (1440)
Persistent Memory    "High"
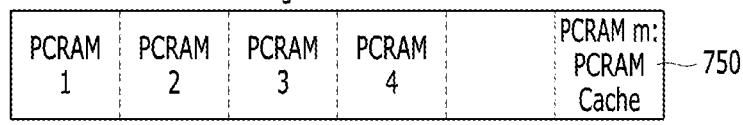
FIG. 14E
Persistent Memory
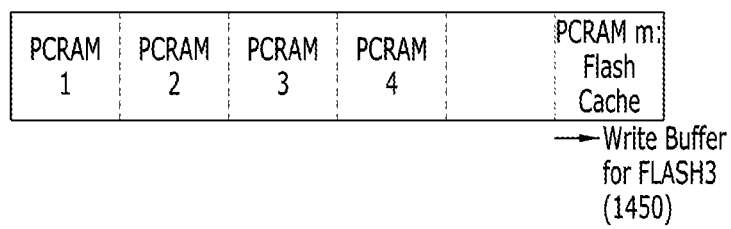
→ Write Buffer for FLASH3 (1450)
Storage    "High"
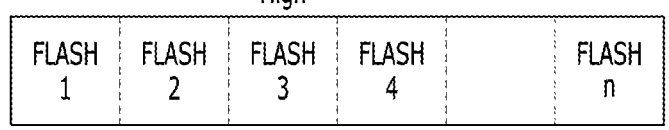

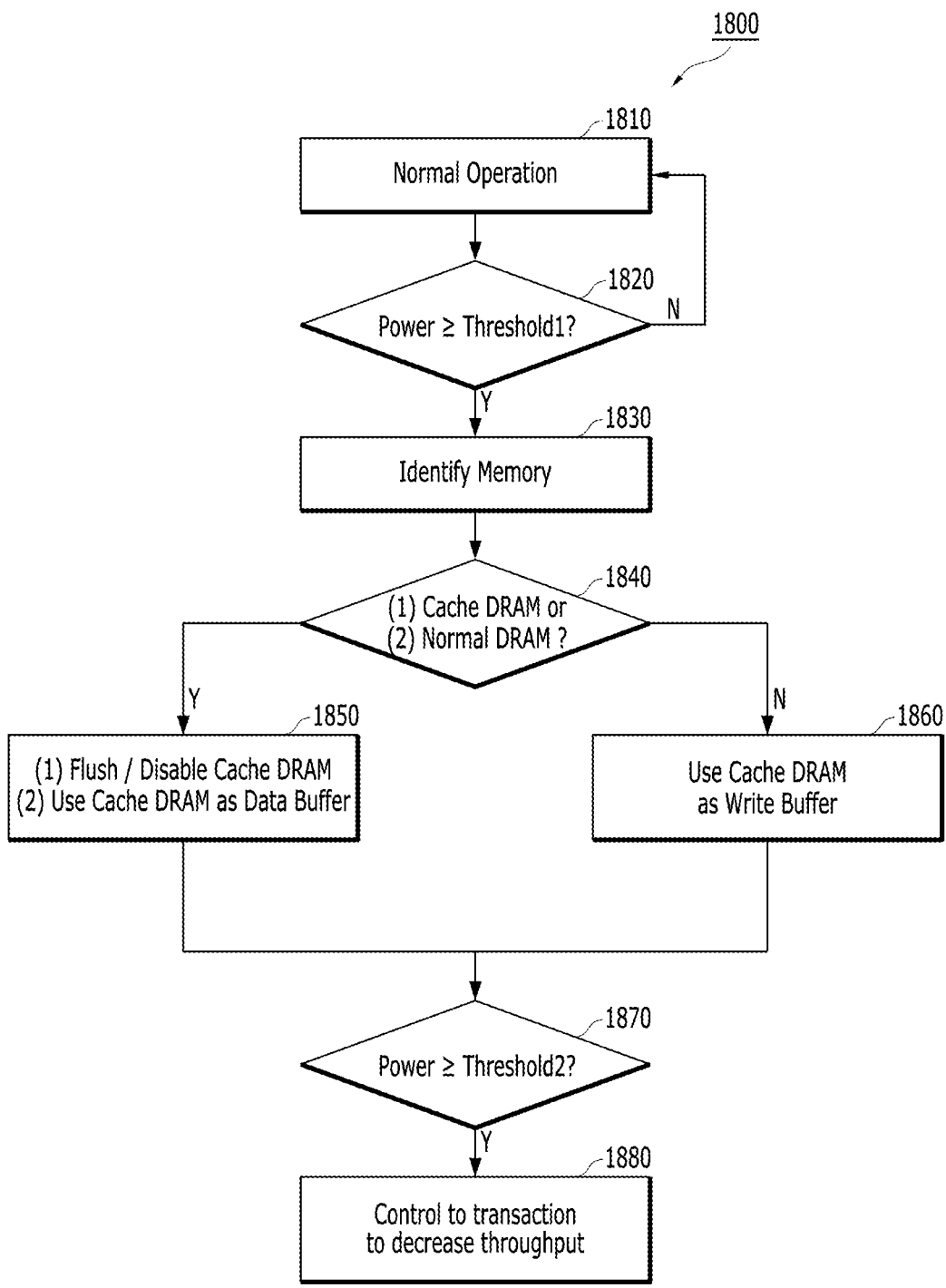

CONVERGED MEMORY DEVICE AND OPERATION METHOD THEREOF

CROSS-REFERENCE TO RELATED APPLICATIONS

The present application claims priority to Korean Patent Application No. 10-2017-0142584, filed on Oct. 30, 2017, which is incorporated herein by reference in its entirety.

BACKGROUND

1. Field

Exemplary embodiments of the present disclosure relate to a converged memory device and a method for operating the converged memory device.

2. Description of the Related Art

Data are becoming most important assets in the fourth industrial revolution, and the demands for new technology in support of transferring and analyzing large-scale data at a high data rate are increasing. For example, as artificial intelligence, autonomous driving, robotic, health care, virtual reality (VR), augmented reality (AR), and smart home technologies are spreading, demands for servers or data centers are increasing.

A legacy data center includes resources for computing, networking, and storing data, in the same equipment. However, a future large-scale data center may construct resources individually and then logically restructure the resources. For example, in the large-scale data center, the resources may be modularized at the level of racks, and the modularized resources may be restructured and supplied according to their usage. Therefore, a converged storage or memory device, which can be used for the future large-scale data center, is demanded.

SUMMARY

Embodiments of the present disclosure are directed to a converged memory device and an operation method thereof, which may improve the endurance and performance of a plurality of memories included in a memory blade mounted on a server system or a data processing system.

In accordance with an embodiment of the present invention, a converged memory device includes: a first memory group having first characteristics; a second memory group having second characteristics that are different from the first characteristics; and a controller configured to migrate predetermined data of the second memory group into a cache region in the first memory group, wherein the controller is further configured to migrate data of the second memory group into the cache region by using the cache region as a buffer when an energy throttling operation is performed on the second memory group.

The energy throttling operation may include an operation of throttling at least one of a temperature and a power of each of the first and second memory groups.

The converged memory device may further include: a thermal sensor that is included in each of the first memory group and the second memory group, and the controller produces a temperature monitoring result by monitoring the temperature of each of the first memory group and the second memory group with the thermal sensor, and performs the energy throttling operation based on the temperature monitoring result.

When the monitoring result reveals that a temperature of the cache region in the first memory group is equal to or higher than a threshold value, the controller disables a use of the cache region.

When the monitoring result reveals that a temperature of a first memory in the first memory group is equal to or higher than a threshold value, the controller uses the cache region as a data buffer of the first memory and stores data stored in the first memory in the cache region.

When the monitoring result reveals that a temperature of a second memory in the second memory group is equal to or higher than a threshold value, the controller stores write data of the second memory in the cache region.

The controller may monitor power of each of the first memory group and the second memory group, and performs the energy throttling operation based on a power monitoring result.

The controller may monitor power of each of the first memory group and the second memory group by monitoring at least one of data transaction and a peak current of each of the first memory group and the second memory group.

When the monitoring result reveals that the power of the cache region in the first memory group is equal to or higher than a threshold value, the controller disables a use of the cache region.

When the monitoring result reveals that the power of a first memory in the first memory group is equal to or higher than a threshold value, the controller uses the cache region as a data buffer of the first memory and stores data stored in the first memory in the cache region.

When the monitoring result reveals that the power of a second memory in the second memory group is equal to or higher than a threshold value, the controller stores write data of the second memory in the cache region.

The cache region may include one physical memory that is selected from among memories in the first memory group.

The cache region may include a logical memory that is formed of particular corresponding regions of memories in the first memory group.

The first characteristics and the second characteristics may include one or both of storage capacity and latency.

The first memory group and the second memory group may include Dynamic Random Access Memories (DRAMs) and Phase-Change Random Access Memories (PCRAMs), respectively.

The first memory group and the second memory group may include Phase-Change Random Access Memories (PCRAMs) and flash memories, respectively.

When the energy throttling operation is performed on a second memory in the second memory group, the controller may further perform an operation of controlling data transaction into the second memory.

The predetermined data may include a hot data.

In accordance with another embodiment of the present invention, a converged memory device includes: a first memory group having first characteristics; a second memory group having second characteristics that are different from the first characteristics; a third memory group having third characteristics that are different from the first characteristics and the second characteristics; and a controller configured to migrate first predetermined data of the second memory group into a first cache region in the first memory group, and to migrate second predetermined data of the third memory group into a second cache region in the second memory group, wherein the controller is further configured to migrate first data of the second memory group into the first cache region by using the first cache region as a buffer when an energy throttling operation is performed on the second memory group, and to migrate second data of the third memory group into the second cache region by using the second cache region as a buffer when the energy throttling operation is performed on the third memory group.

The energy throttling operation may include an operation of throttling at least one of temperature and power.

The converged memory device may further include: a thermal sensor that is included in each of the first memory group, the second memory group, and the third memory group, wherein the controller produces a temperature monitoring result by monitoring a temperature of each of the first memory group, the second memory group, and the third memory group with the thermal sensor, and performs the energy throttling operation based on the temperature monitoring result.

When the temperature monitoring result reveals that a temperature of the first cache region in the first memory group is equal to or higher than a threshold value, the controller may flush data stored in the first cache region into the second cache region and disables a use of the first cache region.

When the temperature monitoring result reveals that a temperature of a first memory in the first memory group is equal to or higher than a threshold value, the controller may use the first cache region as a data buffer of the first memory and stores data stored in the first memory in the first cache region.

When the temperature monitoring result reveals that a temperature of the second cache region in the second memory group is equal to or higher than a threshold value, the controller may disable a use of the second cache region.

When the temperature monitoring result reveals that a temperature in a second memory in the second memory group is equal to or higher than a threshold value, the controller may store write data of the second memory in the first cache region.

When the temperature monitoring result reveals that a temperature of a third memory in the third memory group is equal to or higher than a threshold value, the controller may store write data of the third memory in the second cache region.

The controller monitors power of each of the first memory group, the second memory group, and the third memory group, and perform the energy throttling operation based on a power monitoring result.

The controller may monitors power of each of the first memory group, the second memory group, and the third memory group by monitoring at least one of a data transaction and a peak current of each of the first memory group, the second memory group, and the third memory group.

When the power monitoring result reveals that the power of the first cache region in the first memory group is equal to or higher than a threshold value, the controller may flush data stored in the first cache region into the second cache region and disables a use of the first cache region.

When the power monitoring result reveals that the power of a first memory in the first memory group is equal to or higher than a threshold value, the controller may use the first cache region as a data buffer of the first memory and stores data stored in the first memory in the first cache region.

When the power monitoring result reveals that the power of the second cache region in the second memory group is equal to or higher than a threshold value, the controller may disable a use of the second cache region.

When the power monitoring result reveals that the power of a second memory in the second memory group is equal to or higher than a threshold value, the controller may store write data of the second memory in the first cache region.

When the power monitoring result reveals that the power of a third memory in the third memory group is equal to or higher than a threshold value, the controller may store write data of the third memory in the second cache region.

The first cache region may include one physical memory that is selected from among memories in the first memory group, and the second cache region may include one physical memory that is selected from among memories in the second memory group.

The first cache region may include a logical memory that is formed of particular corresponding regions of memories in the first memory group, and the second cache region may include a logical memory that is formed of particular corresponding regions of memories in the second memory group.

Each of the first characteristics to third characteristics may include at least one of storage capacity and latency.

The first memory group may include Dynamic Random Access Memories (DRAMs), and the second memory group includes Phase-Change Random Access Memories (PCRAMs), and the third memory group includes flash memories When the energy throttling operation is performed on a memory in the second memory group or a memory in the third memory group, the controller may further performs an operation of controlling a data transaction in the memory on which the energy throttling operation is performed.

Each of the first and second predetermined data may include hot data.

In accordance with yet another embodiment of the present invention, a method for operating converged memory device including a first memory group having first characteristics and a second memory group having second characteristics that are different from the first characteristics includes: migrating predetermined data of the second memory group into a cache region in the first memory group; and throttling energy of a memory in the second memory group by using the cache region as a buffer, and migrating data of the memory in the second memory group into the cache region when an energy throttling operation is performed on the memory in the second an energy throttling operation group.

The throttling of the energy of the memory in the second memory group may include throttling one or both of a temperature of the memory in the second memory group and a power of the memory in the second memory group.

The throttling of the energy of the memory in the second memory group may include: producing a temperature monitoring result by monitoring a temperature of each of the first memory group and the second memory group using a thermal sensor that is included in each of the first memory group and the second memory group, and throttling the temperature of each of the first memory group and the second memory group based on the temperature monitoring result.

The throttling of the energy of the memory in the second memory group may further includes: when the temperature monitoring result reveals that a temperature of the cache region in the first memory group is equal to or higher than a threshold value, disabling a use of the cache region.

The throttling of the energy of the memory in the second memory group may further include: when the temperature monitoring result reveals that a temperature of a first memory in the first memory group is equal to or higher than a threshold value, using the cache region as a data buffer of the first memory and storing data stored in the first memory in the cache region.

The throttling of the energy of the memory in the second memory group may include: when the monitoring result reveals that a temperature of the memory in the second memory group is equal to or higher than a threshold value, storing write data of the memory in the cache region.

The throttling of the energy of the memory in the second memory group may include: generating a power monitoring result by monitoring a power of each of the first memory group and the second memory group and throttling the energy of each of the first memory group and the second memory group based on the power monitoring result.

The throttling of the energy of the memory in the second group memories may include: monitoring power of each of the first memory group and the second memory group by monitoring at least one of data transaction and a peak current of each of the first memory group and the second memory group.

The throttling of the energy of the memory in the second memory group may further include: when the power monitoring result reveals that the power of the cache region in the first memory group is equal to or higher than a threshold value, disabling a use of the cache region.

The throttling of the energy of the memory in the second memory group may further include: when the power monitoring result reveals that the power of a first memory in the first memory group is equal to or higher than a threshold value, using the cache region as a data buffer of the first memory and storing data stored in the first memory in the cache region.

The throttling of the energy of the memory in the second memory group may include: when the power monitoring result reveals that the power of the memory in the second memory group is equal to or higher than a threshold value, storing write data of the memory in the cache region.

The cache region may include one physical memory that is selected from among memories in the first memory group.

The cache region may include a logical memory that is formed of particular corresponding regions of memories in the first memory group.

Each of the first characteristics and the second characteristics may include at least one of storage capacity and latency.

The first memory group and the second memory group may include Dynamic Random Access Memories (DRAMs) and Phase-Change Random Access Memories (PCRAMs), respectively.

The first memory group and the second memory group may include Phase-Change Random Access Memories (PCRAMs) and flash memories, respectively.

The throttling of the energy of the memory in the second memory group may further include: when the energy throttling operation is performed on the memory in the second memory group, performing an operation of controlling data transaction into the memory.

The predetermined data may include a hot data.

In accordance with still another embodiment of the present invention, a method for operating a converged memory device including a first memory group having first characteristics, a second memory group having second characteristics that are different from the first characteristics, and a third memory group having third characteristics that are different from the first characteristics and the second characteristics includes: migrating first predetermined data of the second memory group into a first cache region in the first memory group; migrating second predetermined data of the third memory group into a second cache region in the second memory group; throttling an energy of a second memory in the second memory group by using the first cache region as a buffer and migrating data of the second memory into the first cache region when an energy throttling operation is performed on the second memory; and throttling an energy of a third memory in the third memory group by using the second cache region as a buffer and migrating data of the third memory into the second cache region when the energy throttling operation is performed on the third memory.

Each of the throttling of the energy of the second memory and the throttling of the energy of the third memory may include: throttling at least one of a temperature and a power.

The throttling of the energy of the second memory and the throttling of the energy of the third memory may include: producing a temperature monitoring result by monitoring a temperature of each of the first memory group, the second memory group, and the third memory group using a thermal sensor that is included in each of the first memory group, the second memory group, and the third memory group, and throttling an energy of each of the first memory group, the second memory group, and the third memory group based on the temperature monitoring result.

The throttling of the energy of the second memory and the throttling of the energy of the third memory may further include: when the temperature monitoring result reveals that a temperature of the first cache region in the first memory group is equal to or higher than a threshold value, flushing data stored in the first cache region into the second cache region and disabling a use of the first cache region.

The throttling of the energy of the second memory and the throttling of the energy of the third memory may further include: when the temperature monitoring result reveals that a temperature of a first memory in the first group memories is equal to or higher than a threshold value, using the first cache region as a data buffer and storing data stored in the first memory in the first cache region.

The throttling of the energy of the second memory and the throttling of the energy of the third memory may further include: when the temperature monitoring result reveals that a temperature of the second cache region is equal to or higher than a threshold value, disabling a use of the second cache region.

The throttling of the energy of the second memory and the throttling of the energy of the third memory may include: when the temperature monitoring result reveals that a temperature of the second memory is equal to or higher than a threshold value, storing write data of the second memory in the first cache region.

The throttling of the energy of the second memory and the throttling of the energy of the third memory may include: when the temperature monitoring result reveals that a temperature of the third memory is equal to or higher than a threshold value, storing write data of the third memory in the second cache region.

The throttling of the energy of the second memory and the throttling of the energy of the third memory may include: monitoring power of each of the first memory group, the second memory group, and the third memory group, and throttling energy of each of the first memory group, the second memory group, and the third memory group based on a power monitoring result.

The throttling of the energy of the second memory and the throttling of the energy of the third memory may include:

monitoring power of each of the first memory group, the second memory group, and the third memory group by monitoring at least one of data transaction and a peak current of each of the first memory group, the second memory group, and the third memory group.

The throttling of the energy of the second memory and the throttling of the energy of the third memory may further include: when the power monitoring result reveals that the power of the first cache region in the first memory group is equal to or higher than a threshold value, flushing data stored in the first cache region into the second cache region and disabling a use of the first cache region.

The throttling of the energy of the second memory and the throttling of the energy of the third memory may further include: when the power monitoring result reveals that the power of a first memory in the first memory group is equal to or higher than a threshold value, using the first cache region as a data buffer of the first memory and storing data stored in the first memory in the first cache region.

The throttling of the energy of the second memory and the throttling of the energy of the third memory may further include: when the power monitoring result reveals that the power of the second cache region in the second memory group is equal to or higher than a threshold value, disabling a use of the second cache region.

The throttling of the energy of the second memory and the throttling of the energy of the third memory may include: when the power monitoring result reveals that the power of the second memory in the second memory group is equal to or higher than a threshold value, storing write data of the second memory in the first cache region.

The throttling of the energy of the second memory and the throttling of the energy of the third memory may include: when the power monitoring result reveals that the power of the third memory in the third memory group is equal to or higher than a threshold value, storing write data of the third memory in the second cache region.

The first cache region may include one physical memory that is selected from among memories in the first memory group, and the second cache region may include one physical memory that is selected from among memories in the second memory group.

The first cache region may include a logical memory that is formed of particular corresponding regions of memoires in the first memory group, and the second cache region may include a logical memory that is formed of particular corresponding regions of memories in the second memory group.

Each of the first characteristics to third characteristics may include one or both of storage capacity and latency.

The first memory group includes Dynamic Random Access Memories (DRAMs), and the second memory group includes Phase-Change Random Access Memories (PCRAMs), and the third memory group may include flash memories.

The throttling of the energy of the second memory and the throttling of the energy of the third memory may further include: when the energy throttling operation is performed on the second memory or the third memory, performing an operation of throttling a data transaction characteristic of the memory on which the energy throttling operation is performed.

Each of the first and second predetermined data includes hot data.

BRIEF DESCRIPTION OF THE DRAWINGS

FIGS. 7A to 7C illustrate examples of memories of a memory blade in accordance with embodiments of the present disclosure.

FIG. 10A illustrates an example of a hot page table in accordance with an embodiment of the present disclosure.

FIG. 10B illustrates an example of storing cache data in accordance with an embodiment of the present disclosure.

FIGS. 14A to 14E illustrate an example of a throttling operation of a memory blade for throttling a temperature in accordance with an embodiment of the present disclosure.

FIG. 18 is a flowchart illustrating an operation of a memory blade in detail in accordance with an embodiment of the present disclosure.

DETAILED DESCRIPTION

Figure 1:
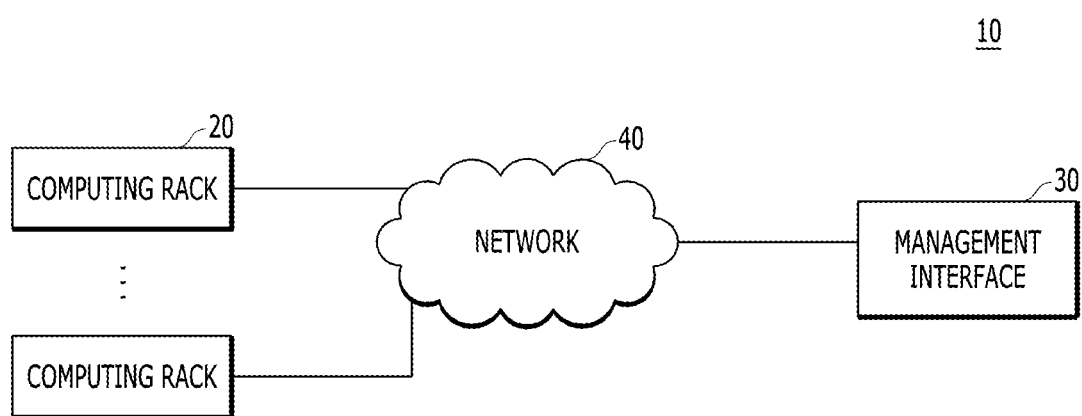
FIG. 1 is a block diagram illustrating a data processing system.

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments.

FIG. 1 is a block diagram illustrating a data processing system 10. Referring to FIG. 1, the data processing system 10 may include a plurality of computing racks 20, a management interface 30, and a network 40 for communication between the computing racks 20 and the management interface 30. The data processing system 10 having this rack-scale architecture may be used by a data center for processing large-scale data.

Each of the computing racks 20 may individually implement one computing device. Alternatively, each of the computing racks 20 may be combined with other computing racks to implement one computing device. The specific structures and operations of the computing racks 20 will be described later on.

The management interface 30 may provide an interactive interface for a user to control, administrate, or manage the data processing system 10. The management interface 30 may be realized using an arbitrary type of a computing device that includes any of a computer, a multi-processor system, a server, a rack-mount server, a blade server, a lap-top computer, a notebook computer, a tablet computer, a wearable computing device, a network device, a web device, a distributed computing system, a processor-based system, a consumer electronic device, and so on.

According to some embodiments of the present disclosure, the management interface 30 may be realized by a distributed system having operation functions which may be performed by the computing racks 20 or having user interface functions which may be performed by the management interface 30. According to other embodiments of the present disclosure, the management interface 30 may be realized by a virtual cloud server that includes multi-computing devices distributed through the network 40. The management interface 30 may include a processor, an input/output subsystem, a memory, a data storage device, and a communication circuit.

The network 40 may transfer/receive data between the computing racks 20 and the management interface 30 and/or between the computing racks 20. The network 40 may be realized by an appropriate number of various wired and/or wireless networks. For example, the network 40 may include a publicly accessible global network, such as a wired or wireless Local Area Network (LAN), a Wide Area Network (WAN), a cellular network, and/or the Internet. In addition, the network 40 may include an appropriate number of auxiliary network devices, such as auxiliary computers, routers, and switches.

Figure 2:
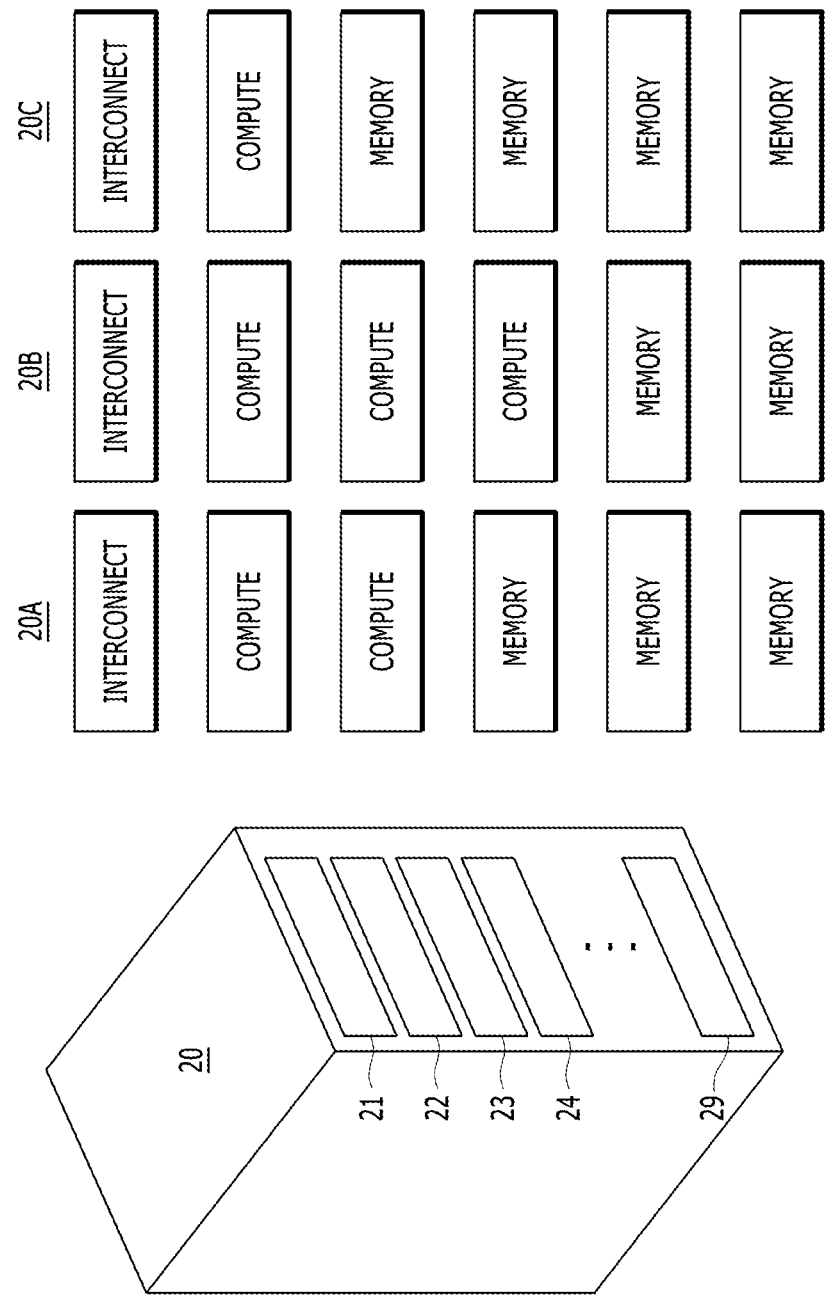
FIGS. 2 and 3 illustrate a computing device in accordance with an embodiment of the present disclosure.

FIG. 2 illustrates a computing device having a rack structure in accordance with an embodiment of the present disclosure.

Referring to FIG. 2, a computing rack 20 may include constituent elements in various forms, and structures, shapes, and names of the constituent elements are not limited. For example, the computing rack 20 may include a plurality of drawers 21 to 29. Each of the drawers 21 to 29 may include a plurality of modules, each of which may include a plurality of blades.

In various embodiments of the present disclosure, the computing rack 20 may be realized by a combination of appropriate numbers of compute blades, memory blades, and/or interconnect blades. Herein, it is defined that the computing rack 20 is realized by a combination of a plurality of blades, but the computing rack 20 may also be realized by diversely named elements such as drawers, modules, trays, boards, sashes, or units. The computing rack 20 may have a structure where the constituent elements of the computing rack 20 are disaggregated and classified according to their functions for the sake of convenience in realization. Although not limited, the computing rack 20 may have a structure of an interconnect blade, a compute blade, and a memory blade in a classification order from the top. The computing rack 20 and a computing device including the computing rack 20 may be referred to as 'a rack-scale system' or 'a disaggregated system.'

In an embodiment of the present disclosure, a computing device may be realized by one computing rack 20. In other embodiments, the computing device may be realized by all constituent elements of two or more computing racks 20, realized by some of constituent elements of two or more computing racks 20, or some of constituent elements of one computing rack 20.

In various embodiments of the present disclosure, a computing device may be realized by a combination of appropriate numbers of compute blades, memory blades, and interconnect blades that are included in the computing rack 20. As illustrated in FIG. 2, a computing rack 20A may include two compute blades, three memory blades, and one interconnect blade. A computing rack 20B may include three compute blades, two memory blades, and one interconnect blade. A computing rack 20C may include one compute blade, four memory blades, and one interconnect blade.

Although FIG. 2 illustrates a case where the computing rack 20 is realized by appropriate numbers of compute blades, memory blades, and interconnect blades, the computing rack 20 may include additional constituent elements that may be included in typical servers, such as a power system, a cooling system, an input/output device, and so on.

Figure 3:
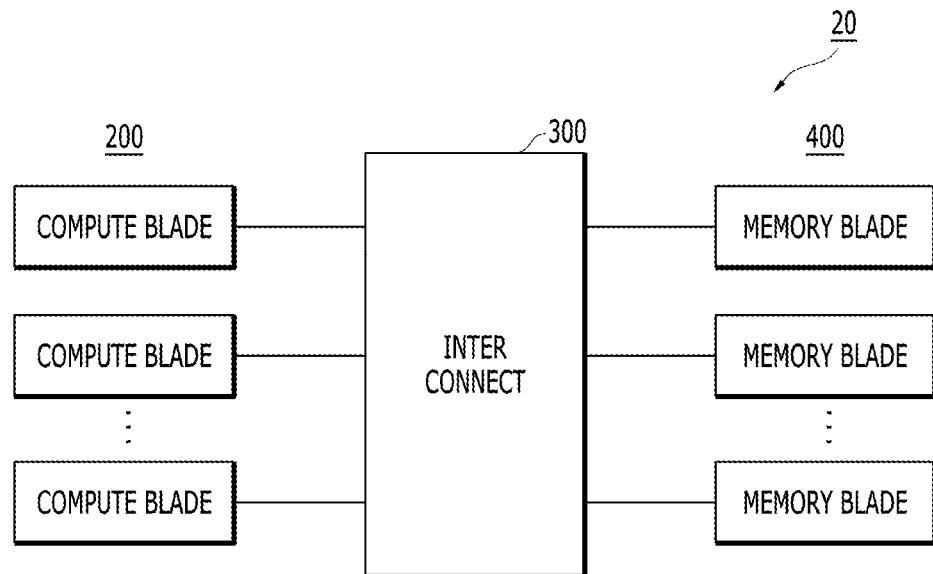

FIG. 3 illustrates a computing device 100 in accordance with an embodiment of the present disclosure.

Referring to FIG. 3, the computing device 100 may include a plurality of compute blades 200, a plurality of memory blades 400, and an interconnect blade 300. The compute blades 200 may be called pooled compute blades or pooled compute systems. Similarly, the memory blades may be called pooled memory blades or pooled memory systems. Herein, it is defined that the computing device 100 is realized by a combination of a plurality of blades, but the computing device 100 may also be realized by diversely named elements such as drawers, modules, trays, boards, sashes, or units.

Each of the compute blades 200 may include one or more of processing elements such as a processor, a processing/control circuit, a Central Processing Unit (CPU), and so on.

Each of the memory blades 400 may include one or more memories, such as volatile memories, non-volatile memories, or a combination thereof. For example, each of the memory blades 400 may include Dynamic Random Access Memories (DRAMs), flash memories, memory cards, hard disk drives (HDDs), solid state drives (SSDs), or a combination thereof.

Each of the memory blades 400 may be divided, allocated, or designated by and used by one or more processing elements that are included in each of the compute blades 200. Also, each of the memory blades 400 may store one or more operating systems (OS) that may be initialized and/or executed by the compute blades 200.

The interconnect blade 300 may include a communication circuit, a communication device, or a combination thererof, which may be divided, allocated, or designated by and used by one or more processing elements included in each of the compute blades 200. For example, the interconnect blade 300 may be realized by an arbitrary number of network interface ports, interface cards, or interface switches. The interconnect blade 300 may use protocols related to one or more wired communication technologies for communication. For example, the interconnect blade 300 may support communication between the compute blades 200 and the memory blades 400 based on one or more of protocols such as PCIe (Peripheral Component Interconnect Express), QPI (QuickPath Interconnect), Ethernet, and the like.

Figure 4:
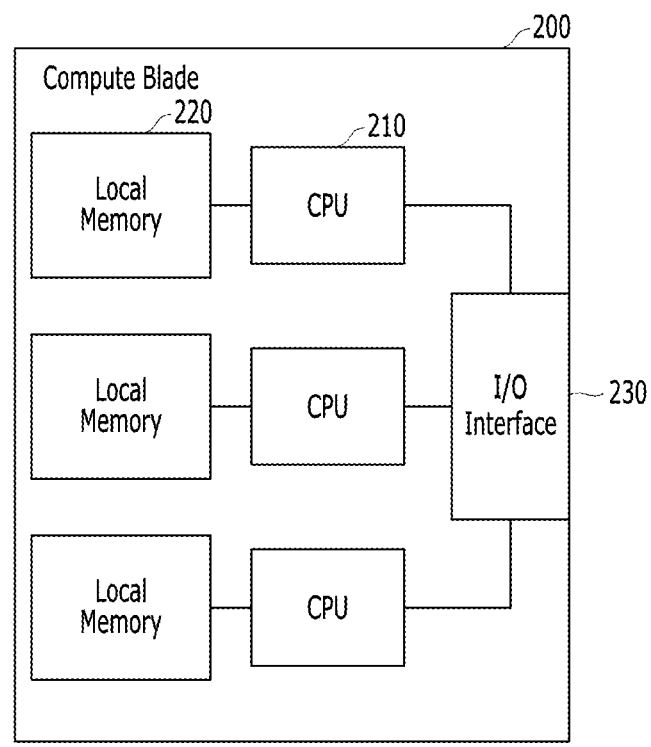
FIG. 4 is a block diagram illustrating a compute blade in accordance with an embodiment of the present disclosure.

FIG. 4 is a block diagram illustrating a compute blade 200 in accordance with an embodiment of the present disclosure.

Referring to FIG. 4, the compute blade 200 may include one or more Central Processing Units (CPUs) 210, one or more local memories 220, and an input/output (I/O) interface 230.

The CPUs 210 may divide, allocate, or designate one or more memory blades to be used, among the memory blades 400 illustrated in FIG. 3. Also, the CPUs 210 may initialize the one or more memory blades, and perform a data read operation and/or a data write (i.e., program) operation on the one or more memory blades.

The local memories 220 may store data to perform an operation of the CPUs 210. In various embodiments of the present disclosure, the local memories 220 may be in a one-to-one correspondence with the CPUs 210.

The input/output interface 230 may support interfacing between the CPUs 210 and the memory blades 400 through the interconnect blade 300 of FIG. 3. The input/output interface 230 may use protocols related to one or more wired communication technologies, output and transfer data from the CPUs 210 to the interconnect blade 300, and receive data inputted from the interconnect blade 300 to the CPUs 210. For example, the input/output interface 230 may support communication between the CPUs 210 and the interconnect blade 300 using one or more of protocols such as PCIe (Peripheral Component Interconnect Express), QPI (QuickPath Interconnect), Ethernet, and the like.

Figure 5A:
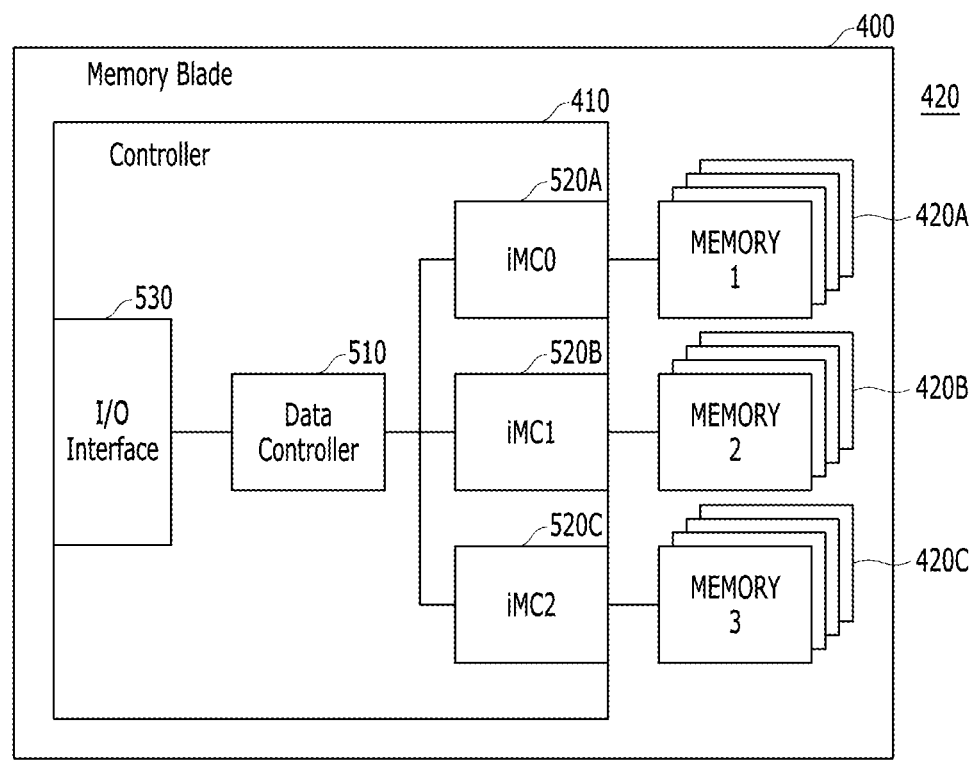
FIGS. 5A and 5B are block diagrams illustrating memory blades in accordance with embodiments of the present disclosure.
Figure 5B:
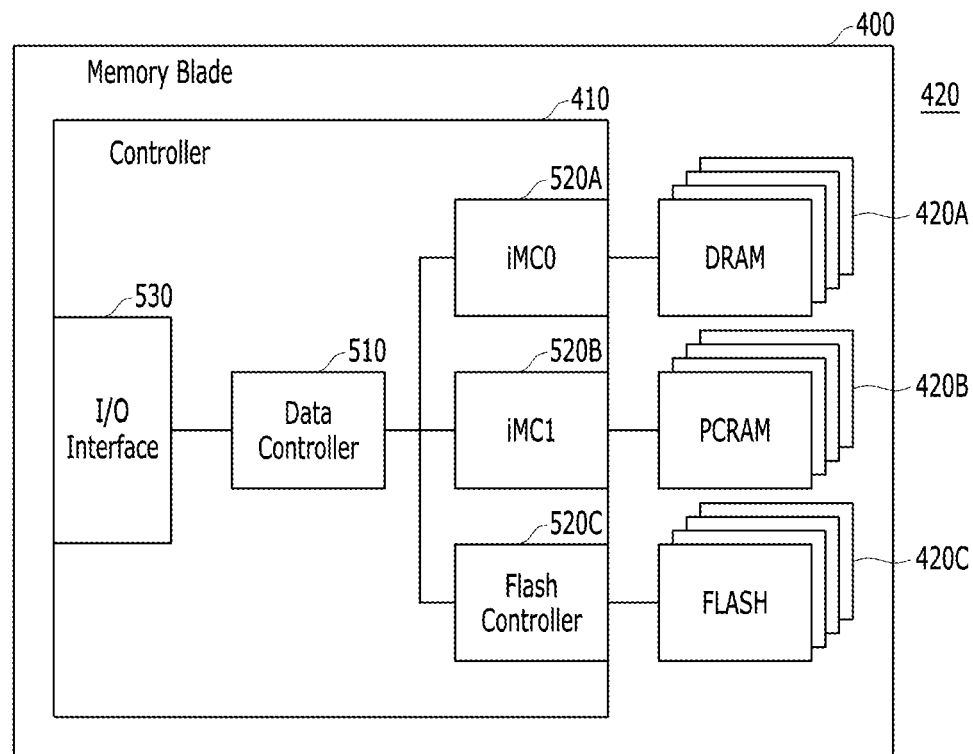

FIGS. 5A and 5B are block diagrams illustrating a memory blade 400 in accordance with an embodiment of the present disclosure.

Referring to FIG. 5A, the memory blade 400 may include a controller 410 and a plurality of memories 420. The memories 420 may store (or write) data therein or output (or read out) stored data under the control of the controller 410. The memories 420 may include a first memory group 420A, a second memory group 420B, and a third memory group 420C. Each of the first, second, and third memory groups 420A, 420B, and 420C may include a multiplicity of memories. The first memory group 420A, the second memory group 420B, and the third memory group 420C may have the same characteristics or different characteristics. In various embodiments of the present disclosure, the first memory group 420A, the second memory group 420B, and the third memory group 420C may include memories having different characteristics in terms of capacity or latency.

Referring to FIG. 5B, the first memory group 420A may include Dynamic Random Access Memories (DRAMs). The second memory group 420B may include Phase-Change Random Access Memories (PCRAMs). The third memory group 420C may include flash memories.

The capacity characteristics may be in relationship of the first memory group 420A<second memory group 420B<third memory group 420C. The latency characteristics may be in relationship of the first memory group 420A<second memory group 420B<third memory group 420C. In other words, the capacity of the third memory group 420C may be the greatest and the capacity of the first memory group 420A may be the smallest, while the latency of the first memory group 420A is the shortest and the latency of the third memory group 420C may be the longest.

FIG. 5B illustrates a case where the first memory group 420A includes DRAMs, the second memory group 420B includes PCRAMs, and the third memory group 420C includes flash memories, but embodiments are not limited thereto. In other embodiments, it is possible that various forms of memories having different characteristics are used for the first memory group 420A, the second memory group 420B, and the third memory group 420C.

In some embodiments, when the third memory group 420C includes flash memories, the first memory group 420A may include Static Random Access Memories (SRAMs), and the second memory group 420B may include Magnetic Random Access Memories (MRAMs) or Spin Torque Transfer Random Access Memories (STT-RAMs).

Referring back to FIG. 5A, the controller 410 may include a data controller 510, memory controllers MC 520A to 520C, and an input/output (I/O) interface 530.

The data controller 510 may control data that are transferred/received between the memories 420 and the compute blades 200 shown in FIG. 3. For example, in response to a write request or command, the data controller 510 may receive write data from the compute blades 200 and control a write operation for programming the write data in a corresponding memory among the memories 420. In a read operation, in response to a read request or command, the data controller 510 may read out data stored in a particular memory among the memories 420 and control the read operation for outputting the read data to a corresponding compute blade among the compute blades 200.

The memory controllers 520A to 520C may be positioned between the data controller 510 and the memories 420 and support interfacing between the data controller 510 and the memories 420. The memory controllers 520A to 520C may include a first memory controller iMC0 520A, a second memory controller iMC1 520B, and a third memory controller iMC2 520C that respectively correspond to the first memory group 420A, the second memory group 420B, and the third memory group 420C included in the memories 420. The first memory controller iMC0 520A may be disposed between the data controller 510 and the first memory group 420A and support a data transfer/reception between the data controller 510 and the first memory group 420A. The second memory controller iMC1 520B may be disposed between the data controller 510 and the second memory group 420B and support a data transfer/reception between the data controller 510 and the second memory group 420B. The third memory controller iMC2 520C may be disposed between the data controller 510 and the third memory group 420C and support a data transfer/reception between the data controller 510 and the third memory group 420C. In the embodiment illustrated in FIG. 5B, when the third memory group 420C includes flash memories, the third memory controller iMC2 520C may be a flash controller.

The input/output interface 530 may support interfacing between the data controller 510 and the compute blades 200 through the interconnect blade 300 of FIG. 3. The input/output interface 530 may use one or more protocols related to wired communication technologies, transfer read data from the data controller 510 to the interconnect blade 300, and transfer write data from the interconnect blade 300 to the data controller 510. For example, the input/output interface 530 may support communication between the data controller 510 and the interconnect blade 300 based on one or more of protocols such as Peripheral Component Interconnect Express (PCIe), QuickPath Interconnect (QPI), Ethernet, and the like.

As described above, a data processing system or a server system may have a structure in which a plurality of blades, e.g., compute blades and memory or storage blades, are discriminatively installed in a unit rack. Herein, one memory blade may include a plurality of memories having different characteristics to fulfill various user workloads. In other words, one memory blade may be a converged memory device in which a plurality of memories, such as DRAMs, SRAMs, PCRAMs, MRAMs, STT-RAMs, and/or flash memories (e.g., NAND-type flash memories), are converged. The converged memory device may be applied to various usage models because memories included in the converged memory device may have different characteristics.

Unlike a DRAM, a PCRAM and a flash memory that may be included in a memory blade may have limited endurance, and may be vulnerable in terms of a temperature and a power due to high energy consumption in a write operation. In short, the converged memory device may consume high power when transferring data in a high bandwidth, and a data error rate may be increased when the converged memory device develops a high temperature due to the high power usage. As a result, the converged memory device may be damaged by the high temperature and/or the high power.

Embodiments of the present disclosure, which will be described below, may improve the endurance of a certain memory, which requires or consumes relatively high energy, in a converged memory device including a plurality of memories, and may improve the performance of the certain memory by decreasing the number of times that the certain memory is used or operates. To this end, in embodiments of the present disclosure, some of the plurality of memories or some regions in the plurality of memories may be used as a cache region for the certain memory. In particular, overhead of data migration may be minimized by storing predetermined data, e.g., a page of hot data, for the certain memory in the cache region. Also, according to embodiments of the present disclosure, the energy consumption of each of the plurality of memories may be monitored and, if necessary, an energy throttling operation may be performed.

For example, according to embodiments of the present disclosure, a temperature and/or a power of each of the plurality of memories may be monitored and a throttling operation for throttling the temperature and/or power of each of the plurality of memories may be performed. According to embodiments of the present disclosure, the vulnerability of a memory to high temperature and power consumption may be improved by variably using some of the plurality of memories or some regions in the plurality of memories, which are designated as the cache region, as a write buffer or a temporary data buffer for the memory during the throttling operation performed for the memory.

A throttling operation for a first memory (e.g., a PCRAM, a flash memory, or the like) may reduce a temperature or average power consumption for the first memory by migrating data stored in the first memory, which consumes relatively high energy, into a preset cache region in a second memory (e.g., a DRAM, an SRAM, or the like), which consumes relatively low energy, and storing the migrated data in the cache region. Through the operation of migrating the data to the cache region, the number of times that a transaction is performed on the first memory, the number of times that the first memory is used, and the number of times that the first memory operates may be decreased. Furthermore, an operation frequency of the first memory may be decreased. In addition, a cycle of a command to operate the first memory may be longer. As a result of the throttling operation, the energy consumption of the first memory may be reduced or minimized. Therefore, a throttling operation for a memory in accordance with embodiments of the present disclosure may be understood as an operation of minimizing or reducing the energy consumption for the memory, which consumes relatively high energy.

Figure 6:
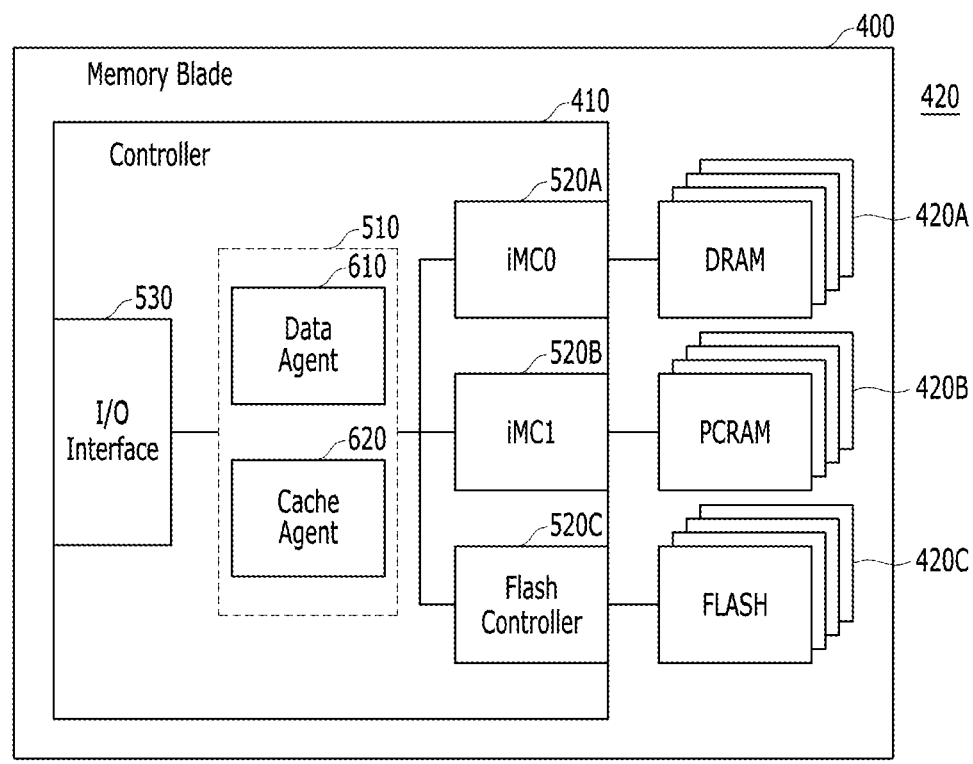
FIG. 6 is a block diagram illustrating a memory blade including a data controller in accordance with an embodiment of the present disclosure.

FIG. 6 is a block diagram illustrating a memory blade 400 including a controller 410 in accordance with an embodiment of the present disclosure.

Referring to FIG. 6, the memory blade 400 may include the controller 410 and memories 420. The memories 420 may include a first memory group 420A, a second memory group 420B, and a third memory group 420C that have different characteristics in, e.g., storage capacity and latency. The first memory group 420A may include DRAMs having first characteristics, the second memory group 420B may include PCRAMs having second characteristics, the second characteristics being different from the first characteristics, and the third memory group 420C may include flash memories having third characteristics, the third characteristics being different from the first characteristics and the second characteristics.

The controller 410 may include a data controller 510, memory controllers MC 520A to 520C, and an input/output (I/O) interface 530. Since the memory blade 400 in FIG. 6 includes the same constituent elements as the constituent elements of the memory blade 400 illustrated above in FIG. 5B, detailed description on the same constituent elements in the memory blade 400 in FIG. 6 may be omitted herein, and a specific structure of the data controller 510 will be described below.

The data controller 510 may include a data agent 610 and a cache agent 620. The data agent 610 may transfer/receive data for a write operation and/or a read operation between the controller 410 and the memories 420. The cache agent 620 may use a predetermined region in the memories 420 as a cache region.

In various embodiments of the present disclosure, the cache agent 620 may use a predetermined region in the first memory group 420A as a first cache region for the second memory group 420B. Also, the cache agent 620 may use a predetermined region in the second memory group 420B as a second cache region for the third memory group 420C. Also, the cache agent 620 may perform a cache control operation for managing least recently used data while using the cache region.

Figure 7A:
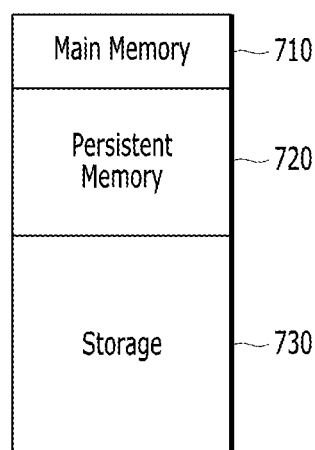

FIGS. 7A to 7C illustrate examples of memories of a memory blade in accordance with an embodiment of the present disclosure.

Referring to FIG. 7A, the memory blade, e.g., the memory blade 400 in FIG. 6, may use memories 420 to form a main memory 710, a persistent memory 720, and a storage 730. In other embodiments, the memory blade 400 may use the memories 420 only as a main memory, or as a convergence of a main memory and a storage.

Referring to FIG. 7B, the main memory 710 may include a first memory group, which includes k DRAMs, among the memories 420. The persistent memory 720 may include a second memory group, which includes m PCRAMs, among the memories 420. The storage 730 may include a third memory group, which includes n flash memories, among the memories 420. Each of K, m, and n is a positive integer.

In various embodiments of the present disclosure, a $k^{th}$ DRAM among the k DRAMs in the main memory 710 may be selected and used as a first cache region 740 for the PCRAMs in the persistent memory 720, and an $m^{th}$ PCRAM among the m PCRAMs in the persistent memory 720 may be selected and used as a second cache region 750 for the flash memories in the storage 730. In short, one physical memory among the memories in each of the main memory 710 and the persistent memory 720 may be used as a cache region.

The above-described method of using the cache region may contribute improving the endurance and performance of PCRAMs and flash memories (e.g., NAND flash memories).

Referring to FIG. 7C, particular corresponding regions of the k DRAMs in the main memory 710 may be selected and used as a first cache region 745 for the PCRAMs in the persistent memory 720, and particular corresponding regions of the m PCRAMs in the persistent memory 720 may be selected and used as a second cache region 755 for the flash memories in the storage 730. In short, a logical memory formed of the particular corresponding regions of the memories in each of the main memory 710 and the persistent memory 720 may be used as a cache region.

Figure 8:
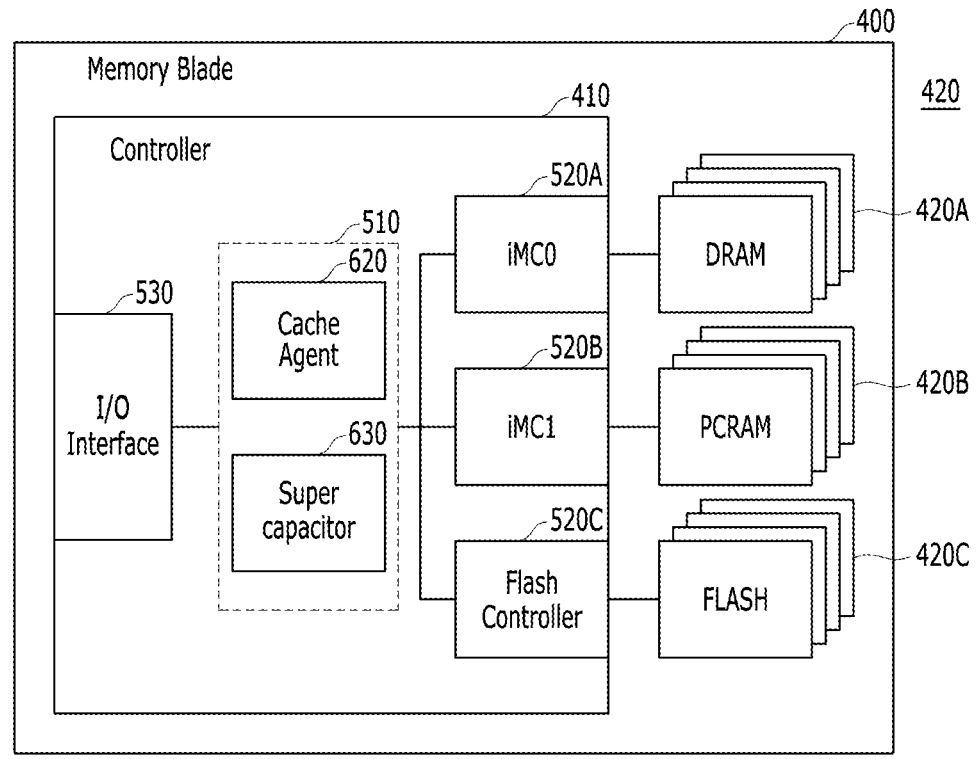
FIG. 8 is a block diagram illustrating a memory blade including a data controller in accordance with an embodiment of the present disclosure.

FIG. 8 is a block diagram illustrating a memory blade 400 including a data controller 510 in accordance with an embodiment of the present disclosure.

Referring to FIG. 8, the memory blade 400 may include the controller 410 and memories 420. The memories 420 may include a first memory group 420A, a second memory group 420B, and a third memory group 420C that have different characteristics in, e.g., storage capacity and latency. The first memory group 420A may include DRAMs having first characteristics, the second memory group 420B may include PCRAMs having second characteristics, the second characteristics being different from the first characteristics, and the third memory group 420C may include flash memories having third characteristics, the third characteristics being different from the first characteristics and the second characteristics. The controller 410 may include the data controller 510, memory controllers MC 520A to 520C, and an input/output (I/O) interface 530. Since the memory blade 400 in FIG. 8 includes the same constituent elements as the constituent elements of the memory blade 400 illustrated in FIG. 5B, detailed description on the same constituent elements in the memory blade 400 in FIG. 8 may be omitted herein, and a specific structure of the data controller 510 will be described below.

The data controller 510 may include a cache agent 620 and a supercapacitor 630. The cache agent 620 may use a predetermined region in the memories 420 as a cache region. Also, the cache agent 620 may perform a cache control operation for managing data, e.g., least recently used data, while using the cache region.

In various embodiments of the present disclosure, as illustrated in FIGS. 6, 7B, and 7C, the cache agent 620 may use a predetermined region in the first memory group 420A as a first cache region for the second memory group 420B. Also, the cache agent 620 may use a predetermined region in the second memory group 420B as a second cache region for the third memory group 420C.

The supercapacitor 630 may be employed to prevent data loss and recover data by performing a flush operation onto data stored in a cache region, e.g., in the DRAMs 420A, even when a power supply is cut off, such as a sudden power off (SPO). In various embodiments of the present disclosure, the supercapacitor 630 makes it possible to flush the data stored in the cache region of the DRAMs 420A even when the power supply is cut off. The supercapacitor 630 is used as a back-up power supply unit for sufficiently supplying a power source to memories of a particular group that include the cache region although the power supply is cut off.

Although it is not shown in FIG. 8, the data controller 510 includes a data agent, which corresponds to the data agent 610 in FIG. 6. The data agent may transfer/receive data for a write operation and/or a read operation between the controller 410 and the memories 420.

Figure 9:
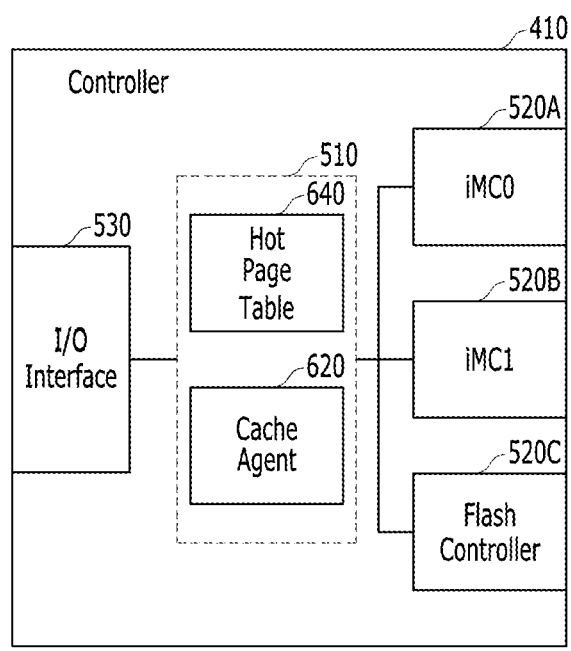
FIG. 9 is a block diagram illustrating a controller including a data controller in accordance with an embodiment of the present disclosure.

FIG. 9 is a block diagram illustrating a controller 410 including a data controller 510 in accordance with an embodiment of the present disclosure.

Referring to FIG. 9, the controller 410 may include the data controller 510, memory controllers MC 520A to 520C, and an input/output (I/O) interface 530.

The data controller 510 may include a cache agent 620 and a hot page table 640. The cache agent 620 may use, as a cache region, a predetermined region in memories (not shown), which may correspond to the memories 420 described above with reference to FIGS. 6 and 8. Also, the cache agent 620 may perform a cache control operation for managing, e.g., least recently used data, while using the cache region.

In various embodiments of the present disclosure, as illustrated in FIGS. 6, 7B, and 7C, the cache agent 620 may use a predetermined region in the first memory group 420A as a first cache region for the second memory group 420B. Also, the cache agent 620 may use a predetermined region in the second memory group 420B as a second cache region for the third memory group 420C.

Although it is not shown in FIG. 9, the data controller 510 includes a data agent, which corresponds to the data agent 610 in FIG. 6, and the data agent may transfer/receive data for a write operation and/or a read operation between the controller 410 and the memories 420.

Since a write operation tends to be performed by converging onto particular addresses of the memories 420, the cache agent 620 may manage predetermined data, e.g., hot data, and migrate and store the hot data into the cache region. In other words, the cache agent 620 may be able to manage data by a page unit (e.g., approximately 4K-bit data) using the hot page table 640. Herein, although a case where the data migrated into the cache region are hot data is described as an example, the cache agent 620 may be able to migrate and store data in a different, predetermined appropriate form into the cache region.

FIG. 10A illustrates an example of a hot page table in accordance with an embodiment of the present disclosure. The storing and management of the hot page table may be carried out by a cache agent, e.g., the cache agent 620 described above.

Referring to FIG. 10A, a hot page table 1010 may include HA, PA, FREQ, and VALID fields. HA may represent a host address requested for a write operation. For example, HA may be an address of the compute blade 200 illustrated in FIG. 3 that is requested for the write operation. PA may be a physical address of a memory that is requested for the write operation.

FREQ may represent a write request frequency count for an address. For example, a value of the FREQ field may be incremented when a write request for the address occurs. The value of the FREQ field may be decreased at a predetermined time interval. When the value of the FREQ field is equal to or less than a predetermined count value, data of a corresponding page may be evicted from a cache region.

VALID may represent whether the data of the corresponding page are cached into the cache region or flushed from the cache region. For example, when a value of the VALID field is '1,' it may represent that the data of the corresponding page are cached into the cache region. On the other hand, when the value of the VALID field is '0,' it may represent that the data of the corresponding page are flushed from the cache region.

For example, referring to FIG. 10A, in a case of a memory whose PA is '0,' write requests have occurred 100 times for the memory and data according to the write requests have been cached into the cache region of the memory, the value of the VALID field is '1.' In a case of a memory whose PA is '2,' write requests have occurred 200 times for the memory, and data according to the write requests have been cached into the cache region of the memory, the value of the VALID field is '1.' On the other hand, in a case of a memory whose PA is '1,' write requests have occurred 50 times for the memory, and data according to the write requests have been evicted from the cache region of the memory, i.e., the data according to the write requests have not been cached into the cache region, the value of the VALID field is '0.'

FIG. 10B illustrates an example of storing a group 1020 of cache data in accordance with an embodiment of the present disclosure. The storing and management of the cache data group 1020 may be carried out by a cache agent, e.g., the cache agent 620 described above.

Referring to FIG. 10B, the cache data may be grouped into a predetermined size corresponding to an address and stored by a group unit. For example, the cache data PA[0], PA[1], . . . , PA[11] may be stored on the basis of a page unit, which is a page including data, e.g., 4K-bit data. In other words, the cache data PA[0], PA[1], . . . , PA[11] may be aligned on the basis of the page unit. The page 1020 including the cache data PA[0], PA[1], . . . , PA[11] may be stored in the cache regions 740 and 750, as illustrated in FIG. 7B, or stored in the cache regions 745 and 755, as illustrated in FIG. 7C.

Figure 11:
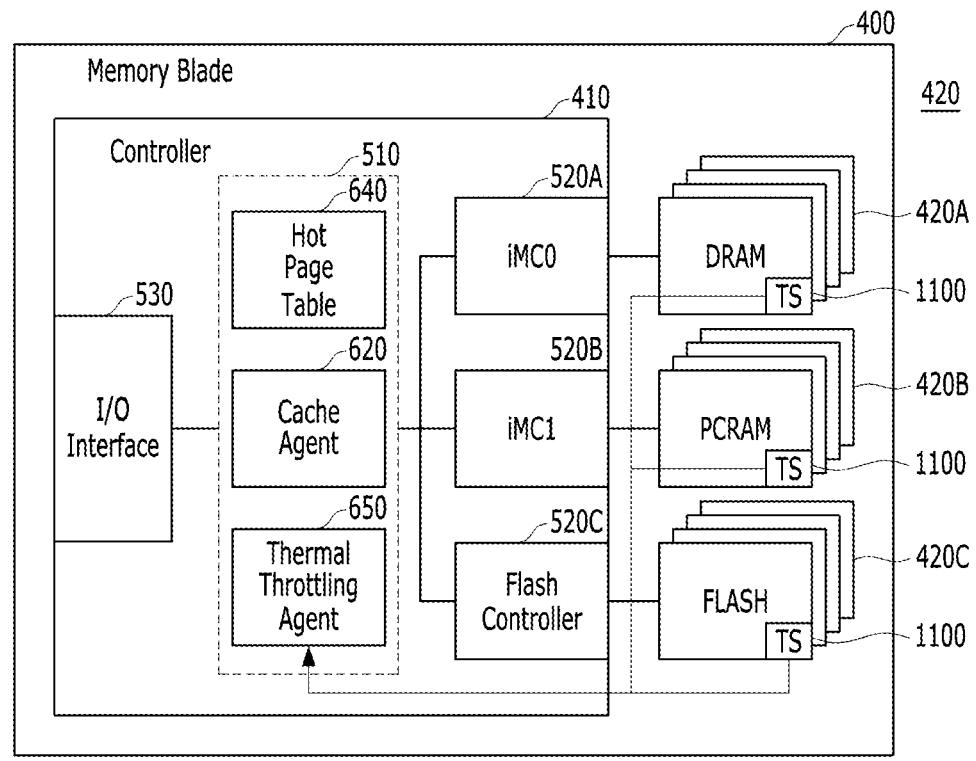
FIG. 11 is a block diagram illustrating a memory blade including a data controller in accordance with an embodiment of the present disclosure.

FIG. 11 is a block diagram illustrating a memory blade 400 including a data controller 510 in accordance with an embodiment of the present disclosure.

Referring to FIG. 11, the memory blade 400 may include a controller 410 and memories 420. The memories 420 may include a first memory group 420A, a second memory group 420B, and a third memory group 420C, which have different storage characteristics, e.g., different storage capacity and latency. The first memory group 420A may include DRAMs having first characteristics, the second memory group 420B may include PCRAMs having second characteristics, the second characteristics being different from the first characteristics, and the third memory group 420C may include flash memories having third characteristics, the third characteristics being different from the first characteristics and the second characteristics. Each of the first memory group 420A, the second memory group 420B, and the third memory group 420C is provided with a thermal sensor (TS) 1100. The thermal sensor 1100 may be able to measure a temperature of a memory corresponding thereto.

The controller 410 may include the data controller 510, memory controllers MC 520A to 520C, and an input/output (I/O) interface 530. Since the memory blade 400 includes the same constituent elements as the constituent elements of the memory blade 400 illustrated above in FIG. 5B, detailed description on the same constituent elements described above may be omitted herein, and a specific structure of the data controller 510 will be described below.

The data controller 510 may include a cache agent 620, a hot page table 640, and a thermal throttling agent 650. The cache agent 620 may use a predetermined region in the memories 420 as a cache region.

In various embodiments of the present disclosure, the cache agent 620 may use a predetermined region in the first memory group 420A as a first cache region for the second memory group 420B. Also, the cache agent 620 may use a predetermined region in the second memory group 420B as a second cache region for the third memory group 420C.

Also, the cache agent 620 may perform a cache control operation for managing, e.g., least recently used data, while using the cache region.

The data controller 510 may include a data agent (not shown), which corresponds to the data agent 610 in FIG. 6. The data agent may transfer/receive data for a write operation and/or a read operation between the controller 410 and the memories 420. The cache agent 620 may use a predetermined region among a portion of the storing regions included in the memories 420 as a cache region. Also, the cache agent 620 may perform a cache throttling operation (e.g., least recently used data management) while using the cache region.

In various embodiments of the present invention, as illustrated in FIGS. 6, 7B, and 7C, the cache agent 620 may use a predetermined region among the storing regions of the first memory group 420A as a cache region for the second memory group 420B. Also, the cache agent 620 may use a predetermined region among the storing regions of the second memory group 420B as a cache region for the third memory group 420C.

Since a write operation tends to be performed by converging onto particular addresses of the memories 420, the cache agent 620 may manage predetermined data, e.g., hot data, and migrate and store the hot data into the cache region. In other words, the cache agent 620 may be able to manage data by a page unit using the hot page table 640. A page may include 4K-bit data.

The thermal throttling agent 650 may monitor a temperature of each of the memories 420 by collecting temperature information of each of the memories 420 that is measured by the thermal sensors 1100 mounted on the first memory group 420A, the second memory group 420B, and the third memory group 420C. Also, when the thermal throttling agent 650 decides to control a temperature of a particular memory based on the collected temperature information, the thermal throttling agent 650 may perform a temperature throttling operation for the particular memory.

In various embodiments of the present disclosure, the thermal throttling agent 650 may perform an operation of controlling the use of a cache region for a memory whose temperature is to be throttled. The thermal throttling agent 650 interlocks with the cache agent 620 to perform the operation of controlling the use of a cache region. For example, the thermal throttling agent 650 may perform an operation of changing the use of a cache region for a memory whose temperature is to be throttled, such that the cache region is used as a write buffer or a temporary data buffer for the memory. Specific examples for the operation of controlling the use of a cache region, which is performed by the thermal throttling agent 650, will be described later with reference to FIGS. 14A to 14E.

Also, the thermal throttling agent 650 may perform an operation of throttling a data transaction characteristic for the memory whose temperature is to be throttled. For example, the thermal throttling agent 650 may control the input/output interface 530 to decrease a data throughput, a transmission rate, or a bandwidth of the memory whose temperature is to be throttled.

Also, the thermal throttling agent 650 may adjust an operating speed of a cooling fan (not shown), which is mounted on the memory whose temperature is to be throttled. For example, the thermal throttling agent 650 may be able to decrease a temperature of a high-temperature memory by increasing an operating speed of a cooling fan mounted on the high-temperature memory.

When it is decided that a temperature of a particular memory should be throttled, the above-mentioned operations performed by the thermal throttling agent 650 of the data controller 510 may be sequentially performed in an appropriate order. For example, the thermal throttling agent 650 may perform a temperature throttling operation in the order of adjusting a fan speed→controlling the usage of a cache region→controlling data transaction. Energy consumption of a memory whose energy consumption is high due to a high temperature can be reduced by performing a temperature throttling operation on the memory.

Figure 12:
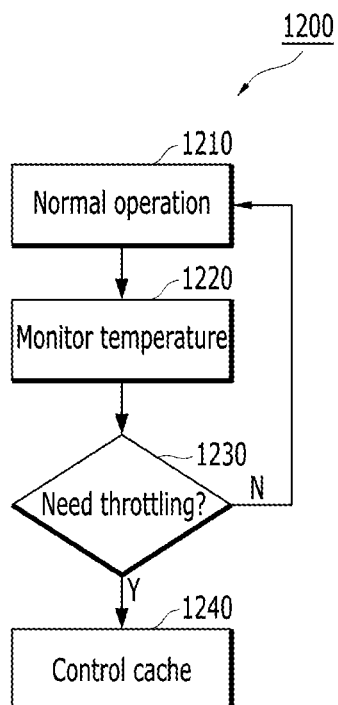
FIG. 12 is a flowchart briefly illustrating an operation of a memory blade in accordance with an embodiment of the present disclosure.

FIG. 12 is a flowchart illustrating an operation 1200 of a memory blade in accordance with an embodiment of the present disclosure. The operation 1200 may be controlled by the data controller 510 illustrated in FIG. 11.

Referring to FIG. 12, the data controller 510 may perform a normal operation in step 1210 and monitor a temperature of a memory in step 1220. Herein, the normal operation may correspond to a case where the data controller 510 manages hot-page data using a cache region while the data controller 510 performs a write operation and a read operation onto the first memory group 420A, the second memory group 420B, and the third memory group 420C. The normal operation has been described above with reference to FIGS. 6 to 10B.

In various embodiments of the present disclosure, the thermal throttling agent 650 of the data controller 510 may be able to monitor a temperature of each of the memories 420 by collecting temperature information of each of the memories 420. For example, the temperatures of the memories 420 are measured by the thermal sensors 1100 mounted on the first memory group 420A, the second memory group 420B, and the third memory group 420C. The temperatures are measured multiple times at a predetermined frequency, corresponding to a predetermined period.

The thermal throttling agent 650 may decide whether a temperature of a particular memory should be throttled or not based on the collected temperature information in step 1230. When the thermal throttling agent 650 decides that the temperature of the particular memory should be throttled, the thermal throttling agent 650 may perform a temperature throttling operation onto the particular memory.

In various embodiments of the present disclosure, the thermal throttling agent 650 may perform an operation of controlling the use of a cache region for the particular memory whose temperature is to be throttled, by being interlocked with the cache agent 620. For example, the thermal throttling agent 650 may use a cache region as a write buffer or a temporary data buffer for the particular memory whose temperature is to be throttled. The thermal throttling agent 650 is interlocked with the cache agent 620 to perform the operation of controlling the use of a cache region.

In addition, the thermal throttling agent 650 may perform an operation of throttling a data transaction characteristic for the particular memory whose temperature is to be throttled. For example, the thermal throttling agent 650 may be able to control the input/output interface 530 to decrease a data throughput, a transmission rate, or a bandwidth of the particular memory whose temperature is to be throttled.

Also, the thermal throttling agent 650 may adjust an operating speed of a cooling fan (not shown) that is mounted on the particular memory whose temperature is to be throttled. For example, the thermal throttling agent 650 may be able to decrease a temperature of a high-temperature memory by increasing an operating speed of a cooling fan mounted on the high-temperature memory.

When it is decided that the temperature of the particular memory should be throttled, the above-mentioned operations performed by the thermal throttling agent 650 of the data controller 510 may be sequentially performed in an appropriate order. For example, the thermal throttling agent 650 may perform a temperature throttling operation in the order of adjusting a fan speed→controlling the usage of a cache region→controlling data transaction.

As described above, when the temperature of the particular memory consuming high energy should be throttled, the data controller 510 may perform an operation of decreasing the temperature of the particular memory by migrating and storing data for the particular memory, which has a relatively high energy consumption (e.g., a PCRAM, a flash memory, or the like), into a predetermined cache region of another memory, which has a relatively low energy consumption (e.g., a DRAM, an SRAM, or the like). Through the operation of migrating and storing data, the number of times that a transaction is performed on the particular memory, the number of times that the particular memory is used, the number of times that the particular memory operates, or a combination thereof, may be decreased. In addition, the operation frequency of the particular memory may be decreased. Furthermore, a cycle of an operation command for operating the particular memory may be increased. As a result, the energy consumption of the particular memory may be decreased or minimized.

Figure 13:
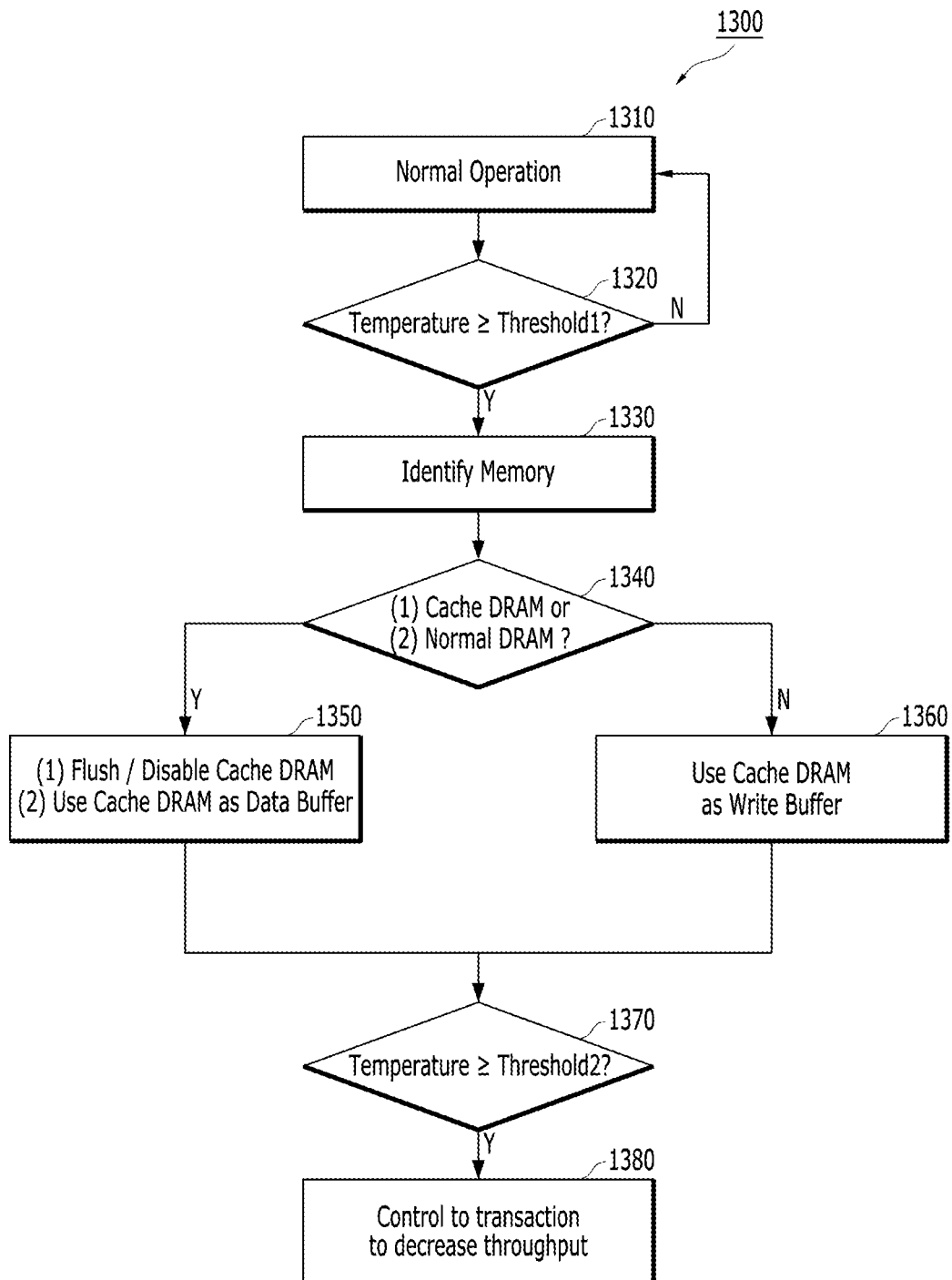
FIG. 13 is a flowchart illustrating an operation of a memory blade in detail in accordance with an embodiment of the present disclosure.

FIG. 13 is a flowchart illustrating an operation 1300 of a memory blade in detail in accordance with an embodiment of the present disclosure. The operation 1300 may be controlled by the data controller 510 illustrated in FIG. 11.

Referring to FIG. 13, the data controller 510 may perform a normal operation in step 1310. Herein, the normal operation may correspond to a case where the data controller 510 performs an operation of managing hot-page data using a cache region while performing a write operation and a read operation on the first memory group 420A, the second memory group 420B, and the third memory group 420C, as described above with reference to FIGS. 6 to 10B.

The thermal throttling agent 650 of the data controller 510 may monitor a temperature of each of the memories 420 and determine whether the temperature of each of the memories 420 is equal to or higher than a first threshold value THRESHOLD1 in step 1320. In various embodiments of the present disclosure, the thermal throttling agent 650 of the data controller 510 may be able to monitor the temperatures of the memories 420 by collecting temperature information of each of the memories 420 that is measured by the thermal sensors 1100 mounted on the first memory group 420A, the second memory group 420B, and the third memory group 420C.

When it is decided that a temperature of a particular memory is equal to or higher than the first threshold value THRESHOLD1, the temperature of the particular memory should be throttled because it means that the energy consumption of the particular memory is high. Therefore, when it is decided that the temperature of the particular memory is equal to or higher than the first threshold value THRESHOLD1, the thermal throttling agent 650 may detect identifier (ID) information of the particular memory in step 1330, and perform a thermal throttling operation by controlling the use of a cache region for the particular memory in steps 1340, 1350, and 1360.

A memory whose temperature is determined to be equal to or higher than the first threshold value THRESHOLD1 may be a cache DRAM that is designated as a cache region in the first memory group 420A, a normal DRAM that is not designated as a cache region in the first memory group 420A, a cache PCRAM that is designated as a cache region in the second memory group 420B, a normal PCRAM that is not designated as a cache region in the second memory group 420B, or a memory in the third memory group 420C, i.e., a flash memory.

For the sake of convenience in description, embodiments of the present disclosure may be described by taking a case where a memory whose temperature is determined to be equal to or higher than the first threshold value THRESHOLD1 is a cache DRAM which is designated as a cache region in the first memory group 420A, a case where a memory whose temperature is determined to be equal to or higher than the first threshold value THRESHOLD1 is a normal DRAM which is not designated as a cache region in the first memory group 420A, and a case where a memory whose temperature is determined to be equal to or higher than the first threshold value THRESHOLD1 is a normal PCRAM which is not designated as a cache region in the second memory group 420B. Specific examples on the operation of the thermal throttling agent 650 controlling the use of a cache region will be described by referring to FIGS. 14A to 14E.

When a particular memory whose temperature is determined to be equal to or higher than the first threshold value THRESHOLD1 is the cache DRAM in the first memory group 420A (case (1) of the step 1340 in FIG. 13), the thermal throttling agent 650 may flush data stored in the cache DRAM by being interlocked with the cache agent 620 and disable the use of the cache DRAM as a cache region. In various embodiments of the present disclosure, the data stored in the cache DRAM may be flushed into a cache region, e.g., 750 of FIG. 7B or 755 of FIG. 7B in the second memory group 420B.

When the particular memory is the normal DRAM in the first memory group 420A (a case (2) of the step 1340 in FIG. 13), the thermal throttling agent 650 may use the cache DRAM as a data buffer for the normal DRAM by being interlocked with the cache agent 620 (case (2) of the step 1350 in FIG. 13).

When the particular memory is the normal PCRAM in the second memory group 420B, the thermal throttling agent 650 may use the cache DRAM in the first memory group 420A as a write buffer for the normal PCRAM by being interlocked with the cache agent 620 in step 1360.

Subsequently, the thermal throttling agent 650 may determine whether the temperature of the particular memory whose cache usage has been controlled is equal to or higher than a second threshold value THRESHOLD2 in step 1370. When the temperature of the particular memory is equal to or higher than the second threshold value THRESHOLD2, the thermal throttling agent 650 may perform an operation of throttling a data transaction characteristic for the particular memory in step 1380. For example, the thermal throttling agent 650 may control the input/output interface 530 to decrease a data throughput, a transmission rate, or a bandwidth of the particular memory whose temperature is to be throttled.

In addition, although not illustrated and described herein, the thermal throttling agent 650 may adjust an operating speed of a cooling fan (not shown) that is mounted on the particular memory whose temperature is to be throttled. For example, the thermal throttling agent 650 may be able to decrease a temperature of a high-temperature memory by increasing an operating speed of a cooling fan mounted on the high-temperature memory that is cooling the high-temperature memory.

In various embodiments of the present disclosure, the thermal throttling agent 650 may set reference values so that the first threshold value THRESHOLD1 is smaller than the second threshold value THRESHOLD2. This relationship is set in consideration of a case where a thermal throttling operation fails even though the thermal throttling agent 650 controls the use of a cache region. For example, even when the cache region 745 for a PCRAM illustrated in FIG. 7C is disabled in the operation of controlling the use of a cache region, the temperature of the DRAMs in the main memory 710 may be increased as the access to the DRAMs is increased. In this case, the thermal throttling agent 650 may perform a thermal throttling operation by controlling data transaction for the DRAMs in the main memory 710 in step 1380.

FIGS. 14A to 14E illustrate an example of a throttling operation of a memory blade for throttling a temperature in accordance with an embodiment of the present disclosure. The operation 1300 described with reference to FIG. 13 may be performed by the cache agent 620 and the thermal throttling agent 650 of the data controller 510 illustrated in FIG. 11.

The thermal throttling agent 650 of the data controller 510 may monitor the temperatures of the memories 420 and determine whether a temperature of a particular memory is equal to or higher than a threshold value THRESHOLD or not. When it is determined that the temperature of the particular memory is equal to or higher than the threshold value THRESHOLD, it may be a case where the energy consumption of the particular memory is so high that a thermal throttling operation is needed. The particular memory whose temperature is determined to be equal to or higher than the threshold value THRESHOLD may be a cache DRAM designated as a cache region in the first memory group 420A, a normal DRAM that is not designated as a cache region in the first memory group 420A, a PCRAM designated as a cache region in the second memory group 420B, a normal PCRAM that is not designated as a cache region in the second memory group 420B, or a memory in the third memory group 420C, i.e., a flash memory.

Figure 14A:
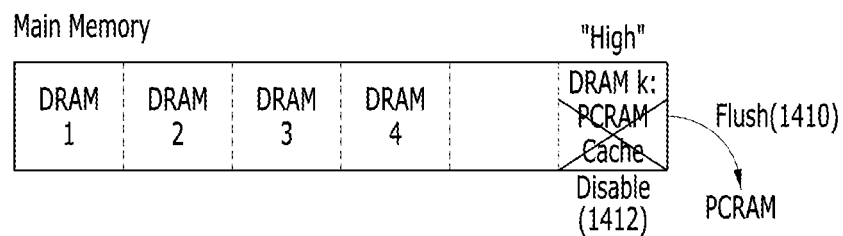

Referring to FIG. 14A, when a temperature of a cache DRAM, e.g., DRAM k, which is designated as a first cache region in the first memory group 420A, is equal to or higher than a threshold value THRESHOLD (e.g., DRAMk High), the data controller 510 may flush data stored in the DRAM k into a PCRAM designated as a second cache region in the second memory group 420B and disable the use of the DRAM k as the first cache region, in step 1410.

Figure 14B:
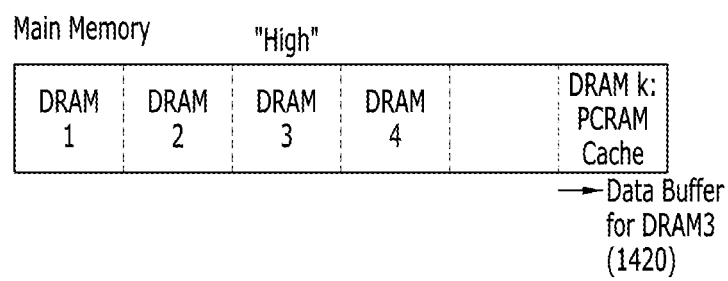

Referring to FIG. 14B, when a temperature of a normal DRAM, e.g., DRAM 3, which is not designated as a cache region in the first memory group 420A, is equal to or higher than a threshold value THRESHOLD (e.g., DRAM3 High), the data controller 510 may use the first cache region, e.g., DRAM k, as a data buffer for the DRAM 3, and store data stored in the DRAM 3 in the DRAM k, in step 1420.

Figure 14C:
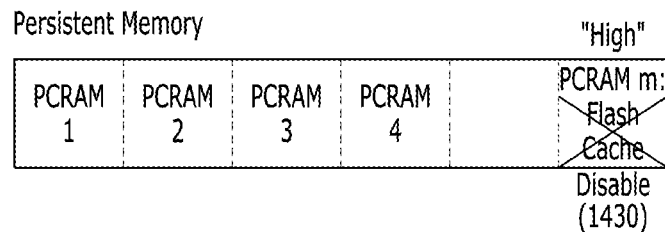

Referring to FIG. 14C, when a temperature of a cache PCRAM, e.g., PCRAM m, designated as a second cache region in the second memory group 420B is equal to or higher than a threshold value THRESHOLD (e.g., PCRAMm High), the data controller 510 may disable the use of the PCRAM m as the second cache region, in step 1430.

Referring to FIG. 14D, when a temperature of a normal PCRAM, e.g., PCRAM 3, which is not designated as a cache region in the second memory group 420B, is equal to or higher than a threshold value THRESHOLD (e.g., PCRAM3 High), the data controller 510 may store write data for the PCRAM 3 in the cache DRAM that is designated as the first cache region in the first memory group 420A, in step 1440. In short, the data controller 510 may use the cache DRAM designated as the first cache region as a write buffer for the PCRAM 3 of the high temperature in the second memory group 420B.

Referring to FIG. 14E, when a temperature of a flash memory, e.g., FLASH 3, in the third memory group 420C is equal to or higher than a threshold value THRESHOLD (e.g., FLASH3 High), the data controller 510 may store write data for the FLASH 3 into a cache PCRAM (PCRAM m) designated as the second cache region in the second memory group 420B, in step 1450. In short, the data controller 510 may use the cache PCRAM designated as the second cache region as a write buffer for the FLASH 3 of the high temperature in the third memory group 420C.

Figures 15, 16:
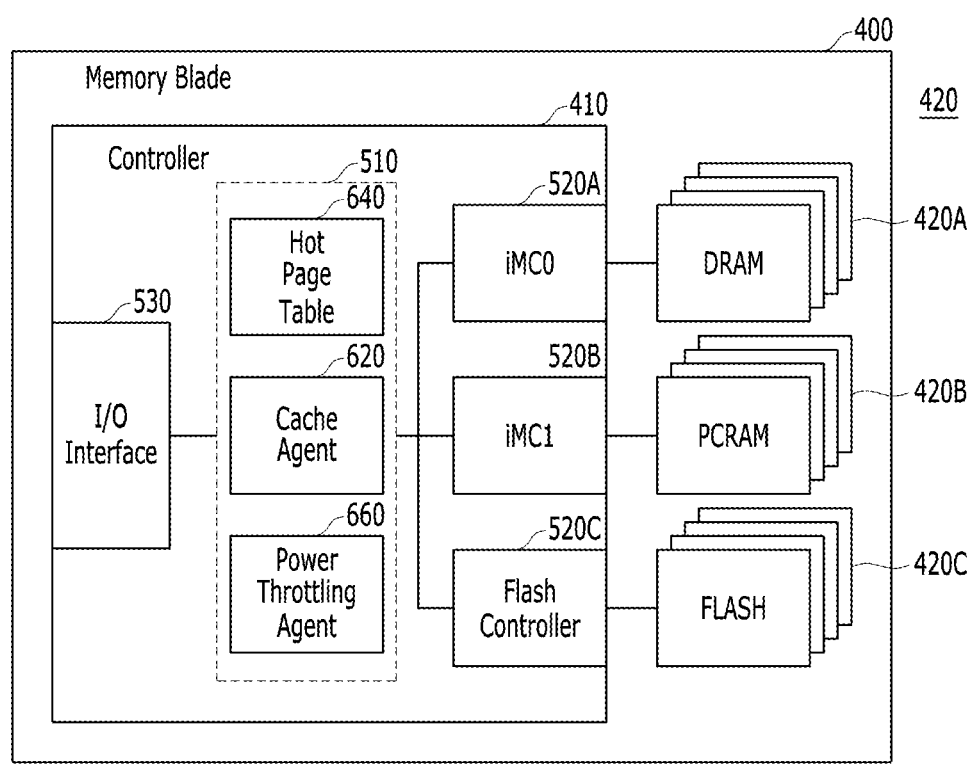
FIG. 15 illustrates an example of using a hot page table as a table for a write buffer during a temperature throttling operation of a memory blade in accordance with an embodiment of the present disclosure.
FIG. 16 is a block diagram illustrating a memory blade including a data controller in accordance with an embodiment of the present disclosure.

FIG. 15 illustrates an example 1500 of using a hot page table as a table for a write buffer during a temperature throttling operation of a memory blade in accordance with an embodiment of the present disclosure. The example 1500 may be controlled by the cache agent 620 and the thermal throttling agent 650 of the data controller 510 illustrated in FIG. 11.

Referring to FIG. 15, the hot page table, which corresponds to the hot page table 640 in FIG. 11, may be used as a table for a write buffer during a thermal throttling operation, instead of being used as a buffer for managing hot-page data in a cache region as illustrated in FIG. 10A in a normal operation. For example, write data for a physical address (PA) 10 may be stored in the cache region, and write data for a physical address 11 may be stored in the cache region, and write data for a physical address 12 may be stored in the cache region, regardless of a write request frequency count for each of the physical addresses 10, 11, and 12, i.e., regardless of whether the write data is hot data or not. In FIG. 15, a write request frequency count for each physical address is '0.'

FIG. 16 is a block diagram illustrating a memory blade 400 including a data controller 510 in accordance with an embodiment of the present disclosure.

Referring to FIG. 16, the memory blade 400 may include a controller 410 and memories 420. The memories 420 may include a first memory group 420A, a second memory group 420B, and a third memory group 420C that have different characteristics, e.g., different storage capacity and latency. The first memory group 420A may include DRAMs having first characteristics, the second memory group 420B may include PCRAMs having second characteristics, the second characteristics being different from the first characteristics, and the third memory group 420C may include flash memories having third characteristics, the third characteristics being different from the first characteristics and the second characteristics.

The controller 410 may include the data controller 510, memory controllers MC 520A to 520C, and an input/output (I/O) interface 530. Since the memory blade 400 includes the same constituent elements as the constituent elements of the memory blades 400 illustrated above in FIG. 5B, detailed description on the same constituent elements described above may be omitted herein, and a specific structure of the data controller 510 will be described below.

The data controller 510 may include a cache agent 620, a hot page table 640, and a power throttling agent 660. The cache agent 620 may use a predetermined region in the memories 420 as a cache region. Also, the cache agent 620 may perform a cache control operation for managing, e.g., least recently used data, while using the cache region.

In various embodiments of the present disclosure, as illustrated in FIGS. 6, 7B, and 7C, the cache agent 620 may use a predetermined region in the first memory group 420A as a first cache region for the second memory group 420B. Also, the cache agent 620 may use a predetermined region in the second memory group 420B as a second cache region for the third memory group 420C.

Since a write operation tends to be performed by converging onto particular addresses of the memories 420, the cache agent 620 may manage predetermined data, e.g., hot data, and migrate and store the hot data into the cache region. In other words, the cache agent 620 may be able to manage data by a page unit (e.g., approximately 4K-bit data) using the hot page table 640.

The power throttling agent 660 may monitor the power for each of the memories 420 by collecting power information of each of memories included in the first memory group 420A, the second memory group 420B, and the third memory group 420C.

In various embodiments of the present disclosure, the power throttling agent 660 may monitor the power for each of the memories 420 by collecting data transaction information (e.g., an amount of write data that is processed) of each of the memories included in the first memory group 420A and the second memory group 420B. Alternatively, the power throttling agent 660 may monitor the power for each of the memories 420 by monitoring a peak current of each of the memories included in the first memory group 420A and the second memory group 420B. The peak current of each of the memories 420 may be measured by a Power Management Integrated Circuit (PMIC).

Also, when it is decided based on the collected power information that the power of a particular memory should be throttled, the power throttling agent 660 may perform a power throttling operation for the particular memory.

In various embodiments of the present disclosure, the power throttling agent 660 may perform an operation of controlling the use of a cache region for the particular memory whose power is to be throttled, by being interlocked with the cache agent 620. For example, the power throttling agent 660 may perform an operation of changing a cache region for the particular memory whose power is decided to be throttled by interlocking with the cache agent 620 into a write buffer. Specific examples for the operation of controlling the use of a cache region, which is performed by the power throttling agent 660, are similar to the operations that have been described above with reference to FIGS. 14A to 14E.

Also, the power throttling agent 660 may perform an operation of controlling data transaction for the particular memory whose power is to be throttled. For example, the power throttling agent 660 may be able to control the input/output interface 530 to decrease a data throughput, a transmission rate, or a bandwidth of the particular memory whose power is to be throttled.

When it is decided that the power of the particular memory should be throttled, the above-mentioned operations performed by the power throttling agent 660 of the data controller 510 may be sequentially performed in an appropriate order or performed concurrently. For example, the power throttling agent 660 may perform a power throttling operation in the order of controlling the cache region usage-→controlling data transaction. It is possible to reduce the energy consumption of a memory whose energy consumption is increased due to excessive data transaction, by performing the power throttling operation on the memory.

Although it is not shown in FIG. 16, the data controller 510 may include a data agent, which corresponds to the data agent 610 in FIG. 6, and the data agent may transfer/receive data for a write operation and/or a read operation between the controller 410 and the memories 420.

Figure 17:
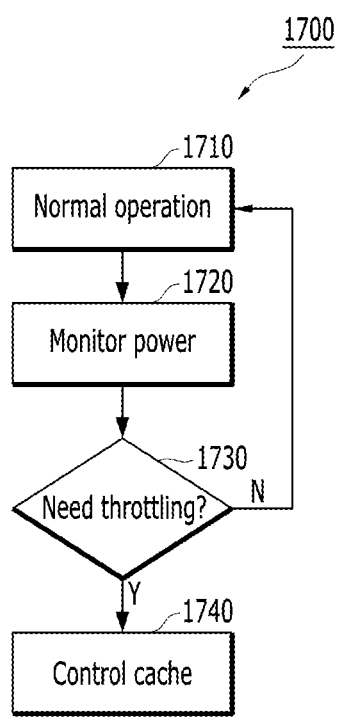
FIG. 17 is a flowchart briefly illustrating an operation of a memory blade in accordance with an embodiment of the present disclosure.

FIG. 17 is a flowchart briefly illustrating an operation 1700 of a memory blade in accordance with an embodiment of the present disclosure. The operation 1700 may be controlled by the data controller 510 illustrated in FIG. 16.

Referring to FIG. 17, the data controller 510 may perform a normal operation in step 1710 and monitor the power of a memory in step 1720. Herein, the normal operation may correspond to a case where the data controller 510 manages hot-page data in a cache region while the data controller 510 performs a write operation and a read operation onto the first memory group 420A, the second memory group 420B, and the third memory group 420C. The normal operation has been described above with reference to FIGS. 6 to 10B.

In various embodiments of the present disclosure, the power throttling agent 660 of the data controller 510 may be able to monitor the power of each of the memories 420 by collecting power information of each of memories included in the first memory group 420A, the second memory group 420B, and the third memory group 420C at a predetermined frequency corresponding to a predetermined period.

In various embodiments of the present disclosure, the power throttling agent 660 may monitor the power for the memories 420 by collecting data transaction information (e.g., an amount of write data that is processed) of each of the memories included in the first memory group 420A and the second memory group 420B. Also, the power throttling agent 660 may monitor the power for the memories 420 by monitoring a peak current of each of the memories included in the first memory group 420A and the second memory group 420B. For example, the peak current of each of the memories 420 may be measured by a Power Management Integrated Circuit (PMIC). The power throttling agent 660 may measure the peak current of each of the memories 420 or measure the peak currents of all the memories 420 by using the PMIC or a substitutable means therefor.

The power throttling agent 660 may decide whether to perform a power throttling operation or not for a particular memory based on the collected power information in step 1730. When it is decided that a power throttling operation should be performed on the particular memory, the power throttling agent 660 may perform the power throttling operation onto the particular memory.

In various embodiments of the present disclosure, the power throttling agent 660 may perform an operation of controlling the use of a cache region for the particular memory whose power is to be throttled, by being interlocked with the cache agent 620 in step 1740. For example, the power throttling agent 660 may perform an operation of changing a cache region for the particular memory whose power is decided to be throttled by interlocking with the cache agent 620 into a write buffer.

In addition, the power throttling agent 660 may perform an operation of controlling data transaction for the particular memory whose power is to be throttled. For example, the power throttling agent 660 may be able to control the input/output interface 530 to decrease a data throughput, a transmission rate, or a bandwidth of the particular memory whose power is to be throttled.

When it is decided that the power of the particular memory should be throttled, the above-mentioned operations performed by the power throttling agent 660 of the data controller 510 may be sequentially performed in an appropriate order or performed concurrently. For example, the power throttling agent 660 may perform a power throttling operation in the order of controlling cache region usage-→controlling data transaction.

As described above, when it is decided that the power of the particular memory consuming high energy should be throttled, the data controller 510 may perform an operation of decreasing the average power of the particular memory by migrating and storing data for the particular memory that has a relatively high energy consumption (e.g., a PCRAM or a flash memory) into a predetermined cache region of a memory that has a relatively low energy consumption (e.g., a DRAM or an SRAM). Through the operation of migrating and storing data, the number of times that a transaction is performed on the particular memory, the number of times that the particular memory is used, or the number of times that the particular memory operates may be decreased, the operation frequency of the particular memory may be decreased, or a cycle of an operation command for operating the particular memory may be increased. As a result, the energy consumption of the particular memory may be decreased or minimized.

FIG. 18 is a flowchart illustrating an operation 1800 of a memory blade in detail in accordance with an embodiment of the present disclosure. The operation 1800 may be controlled by the data controller 510 illustrated in FIG. 16.

Referring to FIG. 18, the data controller 510 may perform a normal operation in step 1810. Herein, the normal operation may correspond to a case where the data controller 510 manages hot-page data in a cache region while the data controller 510 performs a write operation and a read operation onto the first memory group 420A, the second memory group 420B, and the third memory group 420C. The normal operation has been described above with reference to FIGS. 6 to 10B.

The power throttling agent 660 of the data controller 510 may monitor the power of each of the memories 420 and determine whether the power of each of the memories 420 is equal to or higher than a first threshold value THRESHOLD1 in step 1820.

In various embodiments of the present disclosure, the power throttling agent 660 of the data controller 510 may be able to monitor the power of each of the memories 420 by collecting power information of each of memories included in the first memory group 420A, the second memory group 420B, and the third memory group 420C at a predetermined frequency, which corresponds to a predetermined period.

In various embodiments of the present disclosure, the power throttling agent 660 may monitor the power for each of the memories 420 by collecting data transaction information (e.g., an amount of write data that is processed) of each of the memories included in the first memory group 420A and the second memory group 420B. Alternatively, the power throttling agent 660 may monitor the power for each of the memories 420 by monitoring a peak current of each of the memories included in the first memory group 420A and the second memory group 420B. The peak current of each of the memories 420 may be measured by a Power Management Integrated Circuit (PMIC).

The power throttling agent 660 may measure the peak current of each of the memories 420 or measure the peak currents of all the memories 420 by using the PMIC or a substitutable means therefor.

When it is determined that the power for a particular memory is equal to or higher than the first threshold value THRESHOLD1, the energy consumption of the particular memory is so high that a power throttling operation for onto the particular memory should be performed. When it is determined that the power for the particular memory is equal to or higher than the first threshold value THRESHOLD1, the power throttling agent 660 may detect identifier (ID) information of the particular memory in step 1830, and perform the power throttling operation by controlling the use of a cache region for the particular memory in steps 1840, 1850, and 1860.

The particular memory whose power is determined to be equal to or higher than the first threshold value THRESHOLD1 may be a cache DRAM designated as a cache region in the first memory group 420A, a normal DRAM that is not designated as a cache region in the first memory group 420A, a cache PCRAM designated as a cache region in the second memory group 420B, a normal PCRAM that is not designated as a cache region in the second memory group 420B, or a memory in the third memory group 420C, i.e., a flash memory.

For the sake of convenience in description, a case where the particular memory whose power is determined to be equal to or higher than the first threshold value THRESHOLD1 is a cache DRAM designated as a first cache region in the first memory group 420A, a case where the particular memory is a normal DRAM that is not designated as the first cache region in the first memory group 420A, and a case where the particular memory is a normal PCRAM that is not designated as a second cache region in the second memory group 420B are described herein to describe embodiments of the present disclosure. Specific examples of the operation performed by the thermal throttling agent 650 for controlling the use of a cache region are similar to the operations that have been described above by referring to FIGS. 14A to 14E.

In the case where the particular memory whose power is determined to be equal to or higher than the first threshold value THRESHOLD1 is the cache DRAM designated as the first cache region in the first memory group 420A (case (1) of the step 1840 in FIG. 18), the power throttling agent 660 may flush data stored in the cache DRAM by being interlocked with the cache agent 620 and disable the use of the cache DRAM (case (1) of the step 1850 in FIG. 18) as the first cache region. In various embodiments of the present disclosure, the data stored in the cache DRAM may be flushed into a cache region, e.g., 750 of FIG. 7B or 755 of FIG. 7C in the second memory group 420B.

In the case where the particular memory is the normal DRAM in the first memory group 420A (case (2) of the step 1840 in FIG. 18), the power throttling agent 660 may use the cache DRAM as a data buffer for the normal DRAM by being interlocked with the cache agent 620 (case (2) of the step 1850 in FIG. 18).

In the case where the particular memory is the normal PCRAM in the second memory group 420B, the power throttling agent 660 may use the cache DRAM as a write buffer for the normal PCRAM by being interlocked with the cache agent 620 in step 1860.

Subsequently, the power throttling agent 660 may determine whether the power of the particular memory whose cache usage has been controlled is equal to or higher than a second threshold value THRESHOLD2 in step 1870. When the power of the particular memory is equal to or higher than the second threshold value THRESHOLD2, the power throttling agent 660 may perform an operation of controlling data transaction for the particular memory in step 1880. For example, the power throttling agent 660 may be able to control the input/output interface 530 to decrease a data throughput, a transmission rate, or a bandwidth of the particular memory.

In various embodiments of the present disclosure, the power throttling agent 660 may set reference values so that the first threshold value THRESHOLD1 is smaller than the second threshold value THRESHOLD2. This relationship is set in consideration of a case where a power throttling operation fails even though the power throttling agent 660 controls the use of a cache region. For example, even when the cache region 745 for a PCRAM illustrated in FIG. 7C is disabled in the operation of controlling the use of the cache region, the power of the DRAMs in the main memory 710 may be increased as the access to the DRAMs is increased. In this case, the power throttling agent 660 may perform a power throttling operation by controlling data transaction for the DRAMs in the main memory 710 in step 1880.

Meanwhile, the embodiments of the present disclosure described above may be modified and used diversely. For example, the embodiments of the present disclosure described above illustrate the case where they are applied to a converged memory device including a first memory group having first characteristics, a second memory group having second characteristics, which are different from the first characteristics, and a third memory group memories having third characteristics, which are different from the first characteristics and the second characteristics.

Figure 19A:
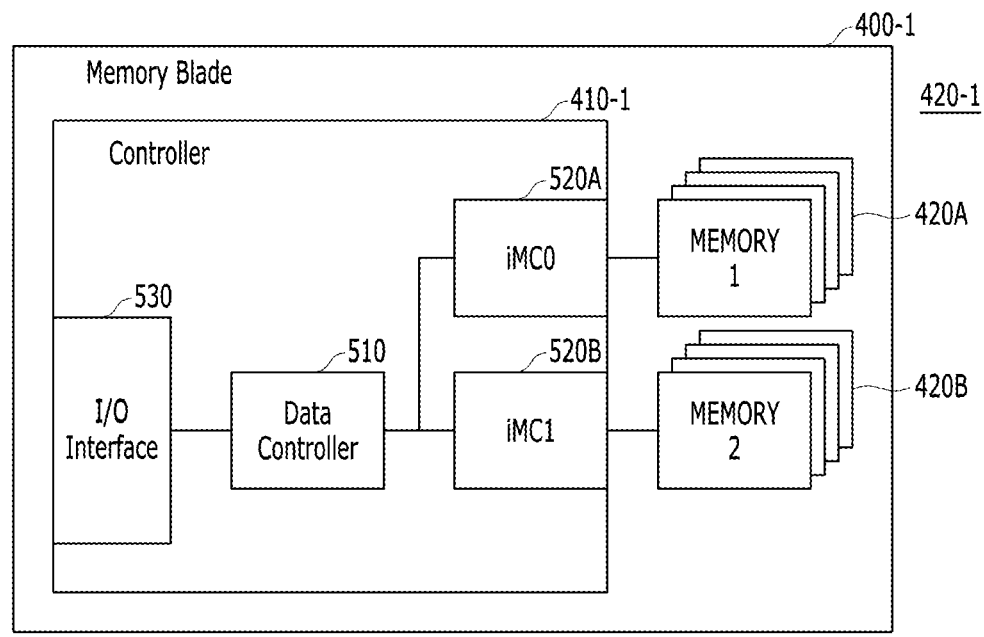
FIGS. 19A to 19F are block diagrams illustrating a memory blade in accordance with an embodiment of the present disclosure.

Modified embodiments of the present disclosure may be applied to a converged memory device as illustrated in FIGS. 19A to 19F. Referring to FIG. 19A, a converged memory device 400-1 may include a controller 410-1 and memories 420-1. The memories 420-1 may include a first memory group 420A having first characteristics, and a second memory group 420B having second characteristics, which are different from the first characteristics. The controller 410-1 may include a memory controller 520A for the first memory group 420A and a memory controller 520B for the second memory group 420B.

Figure 19B:
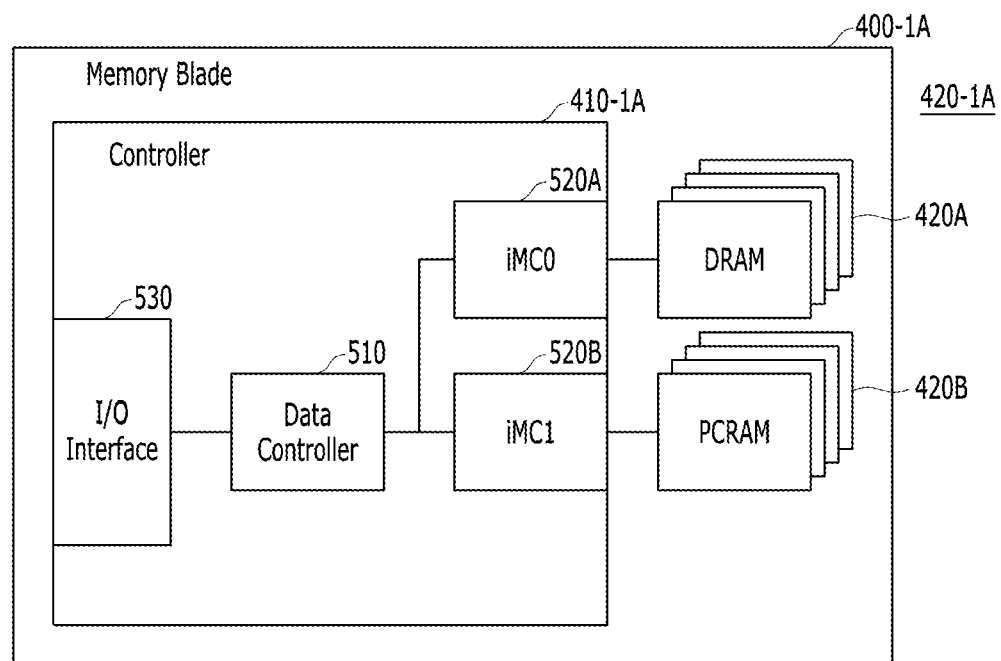

Referring to FIG. 19B, a converged memory device 400-1A may include a controller 410-1A and memories 420-1A. The memories 420-1A may include a first memory group 420A having first characteristics and a second memory group 420B having second characteristics, which are different from the first characteristics. The first memory group 420A may include DRAMs, and the second memory group 420B may include PCRAMs.

Figure 19C:
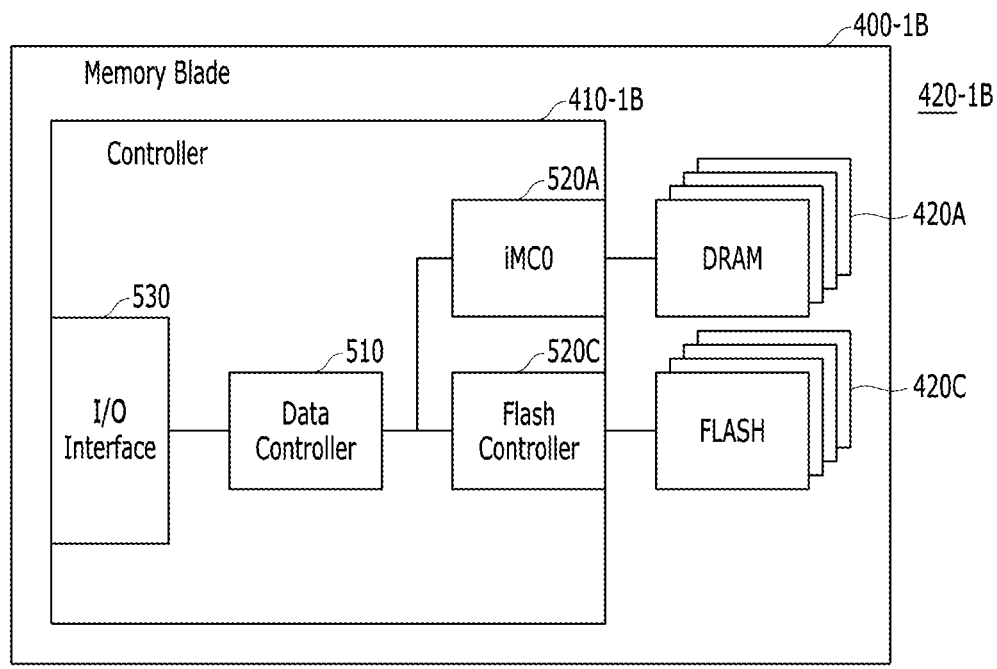

Referring to FIG. 19C, a converged memory device 400-1B may include a controller 410-1B and memories 420-1B. The memories 420-1B may include a first memory group 420A having first characteristics and a second memory group 420C having second characteristics, which are different from the first characteristics. The controller 410-1B may include a memory controller 520A for the first memory group 420A and a memory controller 520C for the second memory group 420C. The first memory group 420A may include DRAMs, and the second memory group 420C may include flash memories.

Figure 19D:
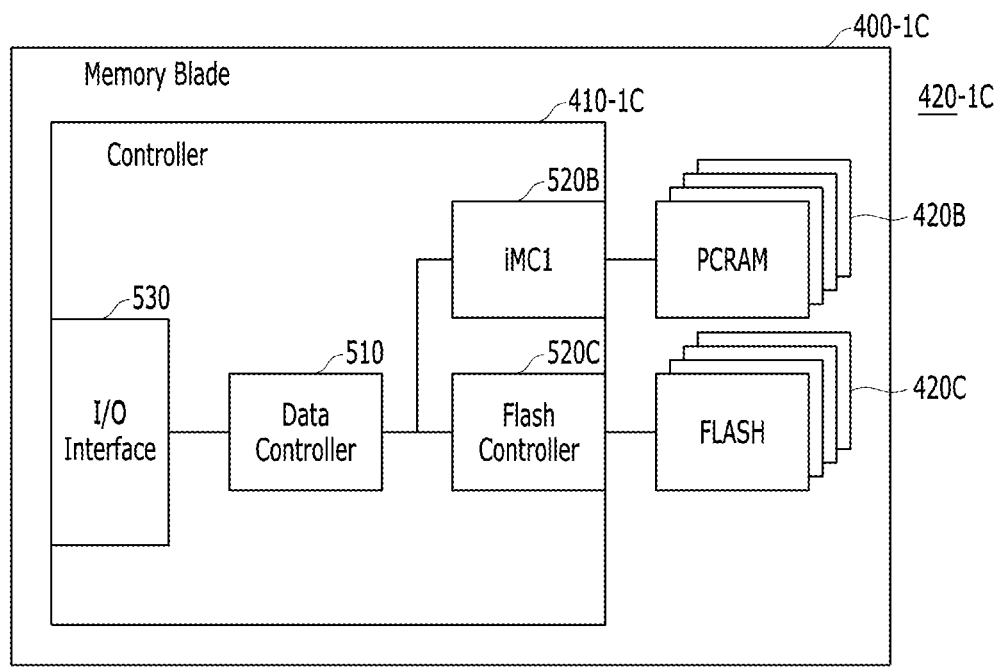

Referring to FIG. 19D, a converged memory device 400-1C may include a controller 410-1C and memories 420-1C. The memories 420-1C may include a first memory group 420B having first characteristics and a second memory group 420C having second characteristics, which are different from the first characteristics. The controller 410-1C may include a memory controller 520B for the first memory group 420B and a memory controller 520C for the second memory group 420C. The first memory group 420B may include PCRAMs, and the second memory group 420C may include flash memories.

Figure 19E:
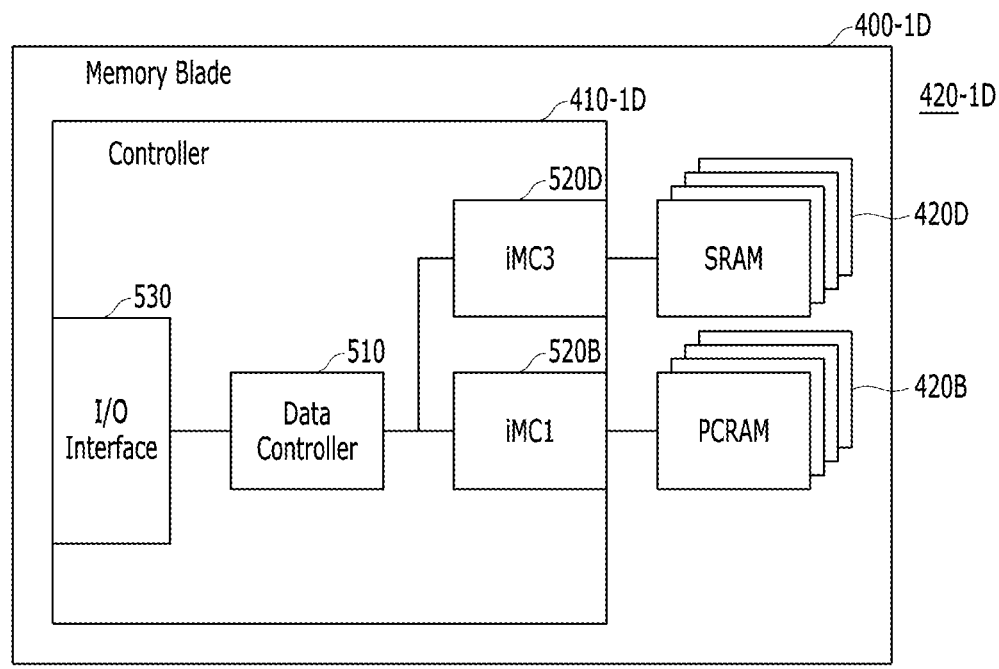

Referring to FIG. 19E, a converged memory device 400-1D may include a controller 410-1D and memories 420-1D. The memories 420-1D may include a first memory group 420D having first characteristics and a second memory group 420B having second characteristics, which are different from the first characteristics. The controller 410-1D may include a memory controller 520D for the first memory group 420D and a memory controller 520B for the second memory group 420B. The first memory group 420D may include SRAMs, and the second memory group 420B may include PCRAMs.

Figure 19F:
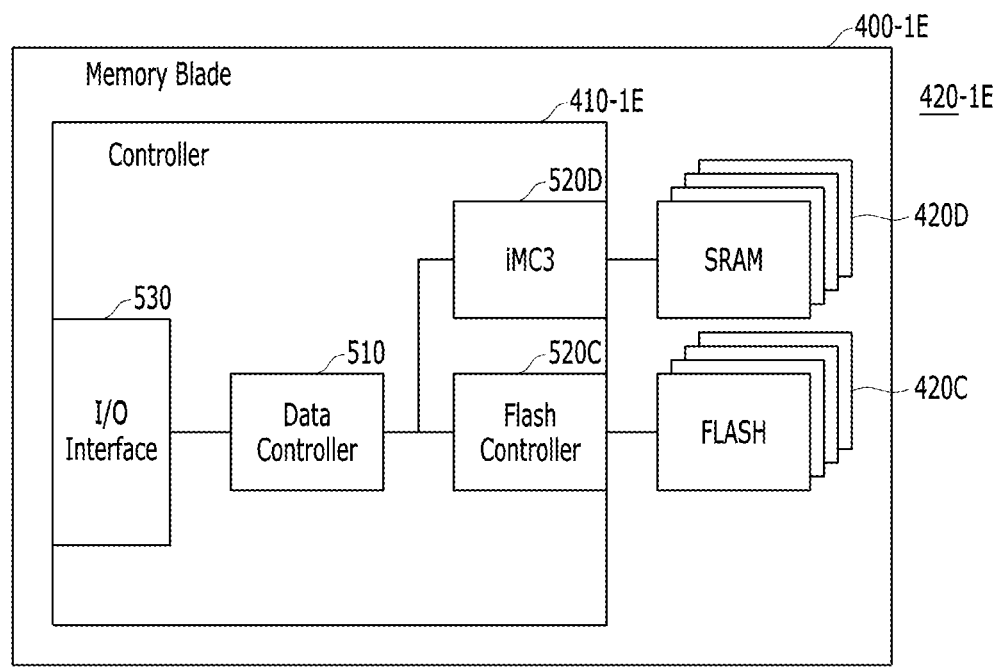

Referring to FIG. 19F, a converged memory device 400-1E may include a controller 410-1E and memories 420-1E. The memories 420-1E may include a first memory group 420D having first characteristics and a second memory group 420C having second characteristics, which are different from the first characteristics. The controller 410-1E may include a memory controller 520D for the first memory group 420D and a memory controller 520C for the second memory group 420C. The first memory group 420D may include SRAMs, and the second memory group 420C may include flash memories.

According to modified embodiments of the present disclosure, a controller may store predetermined data, e.g., hot data, for a second memory group in a predetermined cache region in a first memory group, and when an energy throttling operation is to be performed on particular memory in the second memory group, the controller may use the cache region in the first memory group as a buffer and store data for the particular memory in the cache region.

According to modified embodiments of the present disclosure, the energy throttling operation may include an operation of throttling at least one of temperature and power.

According to modified embodiments of the present disclosure, the controller may monitor a temperature of each of memories included in the first memory group and the second memory group using a thermal sensor included in each of the first memory group and the second memory group, and perform the energy throttling operation based on the temperature monitoring result.

According to modified embodiments of the present disclosure, when the temperature monitoring result reveals that a temperature of the cache region in the first memory group is equal to or higher than a threshold value, the controller may disable the use of the cache region.

According to modified embodiments of the present disclosure, when the temperature monitoring result reveals that a temperature of a normal memory in the first memory group is equal to or higher than the threshold value, the controller may use the cache region in the first memory group as a data buffer for the normal memory and store data stored in the normal memory in the cache region.

According to modified embodiments of the present disclosure, when the temperature monitoring result reveals that a temperature of a particular memory in the second memory group is equal to or higher than the threshold value, the controller may store write data for the particular memory in the second memory group in the cache region in the first memory group.

According to modified embodiments of the present disclosure, the controller may monitor the power of each of the memories included in the first memory group and the second memory group and perform the energy throttling operation based on the power monitoring result.

According to modified embodiments of the present disclosure, the controller may monitor the power of each of the memories included in the first memory group and the second memory group by monitoring at least one of data transaction and a peak current of each of the memories included in the first memory group and the second memory group.

According to modified embodiments of the present disclosure, when the power monitoring result reveals that the power of the cache region in the first memory group is equal to or higher than a threshold value, the controller may disable the use of the cache region.

According to modified embodiments of the present disclosure, when the power monitoring result reveals that the power of a normal memory in the first memory group is equal to or higher than the threshold value, the controller may use the cache region in the first memory group as a data buffer for the normal memory and store data stored in the normal memory in the cache region.

According to modified embodiments of the present disclosure, when the power monitoring result reveals that the power of a particular memory in the second memory group is equal to or higher than the threshold value, the controller may store write data for the particular memory in the cache region in the first memory group.

According to modified embodiments of the present disclosure, the cache region may include one physical memory that is selected from among memories in the first memory group.

According to modified embodiments of the present disclosure, the cache region may include a logical memory which is formed of particular corresponding regions of memories in the first memory group.

According to modified embodiments of the present disclosure, first characteristics and second characteristics of memories may include at least one of storage capacity and latency.

According to modified embodiments of the present disclosure, the first memory group and the second memory group may include DRAMs and PCRAMs, respectively.

According to modified embodiments of the present disclosure, the first memory group and the second memory group may include PCRAMs and flash memories, respectively.

According to modified embodiments of the present disclosure, when one memory requires an energy throttling operation, the controller may further perform an operation of controlling a data transaction in the memory.

According to embodiments of the present disclosure, the endurance and performance of a memory requiring or consuming a relatively high energy among a plurality of memories included in a memory blade of a data center or a data processing system may be improved by decreasing the number of times that the memory requiring or consuming the relatively high energy is used or operate. To this end, according to the embodiments of the present disclosure, some of memories or some corresponding regions of the memories, except the memory requiring or consuming the relatively high energy, may be used as a cache region for the memory. Also, overhead of data migration may be minimized by storing predetermined data (e.g., hot page) for the memory in the cache region. Also, according to embodiments of the present disclosure, the energy consumption of each of memories in a memory blade may be monitored and, if necessary, an energy throttling operation may be performed on each of the memories. For example, according to embodiments of the present disclosure, a temperature and/or power of each of the memories may be monitored and a throttling operation for throttling the temperature and/or power of each of the memories may be performed. According to the embodiments of the present disclosure, weak points in terms of temperature and power may be improved by variably using some of the memories or some corresponding regions of the memories, which are designated as a cache region, as a write buffer or a temporary data buffer during a throttling operation.

While the present invention has been described with respect to the specific embodiments, it will be apparent to those skilled in the art that various changes and modifications may be made without departing from the spirit and scope of the invention as defined in the following claims.

What is claimed is:

1. A converged memory device, comprising:
a first memory module having first characteristics;
a second memory module having second characteristics that are different from the first characteristics; and
a controller including a first interface for interfacing with the first memory module and a second interface for interfacing with the second memory module,
wherein the controller migrates predetermined data of the second memory module into a cache region in the first memory module and to monitor power of each of the first memory module and the second memory module, and
wherein when a power monitoring result reveals that power of a second memory in the second memory module which is physically separated from the first memory module is equal to or higher than a first threshold value and an energy throttling operation is performed on the second memory, the controller migrates data of the second memory into the cache region through the second interface and the first interface by using the cache region as a buffer.

2. The converged memory device of claim 1, further comprising:
a thermal sensor that is included in each of the first memory module and the second memory module,
wherein the controller further includes a data controller, a first memory controller, and a second memory controller, and
wherein the first interface is included in the first memory controller for controlling one or more volatile memories and the second interface is included in the second memory controller for controlling one or more non-volatile memories, and
wherein the data controller produces a temperature monitoring result by monitoring a temperature of each of the first memory module and the second memory module with the thermal sensor, and performs the energy throttling operation based on the temperature monitoring result.

3. The converged memory device of claim 2, wherein when the temperature monitoring result reveals that a temperature of the cache region in the first memory module is equal to or higher than a second threshold value, the data controller disables a use of the cache region.

4. The converged memory device of claim 2, wherein when the temperature monitoring result reveals that a temperature of a first memory in the first memory module is equal to or higher than a second threshold value, the data controller uses the cache region as a data buffer of the first memory and stores data stored in the first memory in the cache region.

5. The converged memory device of claim 2, wherein when the temperature monitoring result reveals that a temperature of the second memory in the second memory module is equal to or higher than a second threshold value, the data controller stores write data of the second memory in the cache region.

6. The converged memory device of claim 1, wherein the controller monitors power of each of the first memory module and the second memory module by collecting data transaction information or monitoring a peak current.

7. The converged memory device of claim 6, wherein the controller monitors the power of each of the first memory module and the second memory module by monitoring at least one of data transaction and a peak current of each of the first memory module and the second memory module.

8. The converged memory device of claim 6, wherein when the power monitoring result reveals that power of the cache region in the first memory module is equal to or higher than the first threshold value, the controller disables a use of the cache region.

9. The converged memory device of claim 6, wherein when the power monitoring result reveals that power of a first memory in the first memory module is equal to or higher than the first threshold value, the controller uses the cache region as a data buffer of the first memory and stores data stored in the first memory in the cache region.

10. The converged memory device of claim 1, wherein the cache region includes one physical memory that is selected from among memories in the first memory module.

11. The converged memory device of claim 1, wherein the cache region includes a logical memory that is formed of particular corresponding regions of memories in the first memory module.

12. The converged memory device of claim 1, wherein each of the first characteristics and the second characteristics include one or both of storage capacity and latency.

13. The converged memory device of claim 12, wherein the first memory module and the second memory module include Dynamic Random Access Memories (DRAMs) and Phase-Change Random Access Memories (PCRAMs), respectively.

14. The converged memory device of claim 12, wherein the first memory module and the second memory module include Phase-Change Random Access Memories (PCRAMs) and flash memories, respectively.

15. The converged memory device of claim 1, wherein when the energy throttling operation is performed on the second memory in the second memory module, the controller further performs an operation of controlling data transaction into the second memory.

16. The converged memory device of claim 1, wherein the predetermined data includes hot data.

17. A method for operating a converged memory system including a first memory module having first characteristics, a second memory module having second characteristics that are different from the first characteristics, and a controller including a first interface for interfacing with the first memory module and a second interface for interfacing with the second memory module, the method comprising:
migrating predetermined data of the second memory module into a cache region in the first memory module;
monitoring power of each of the first memory module and the second memory module; and
when a power monitoring result reveals that power of a second memory in the second memory module which is physically separated from the first memory module is equal to or higher than a first threshold value and an energy throttling operation is performed on the second memory, migrating data of the second memory in the second memory module into the cache region through the second interface and the first interface.

18. The method of claim 17,
wherein the controller further includes a data controller, a first memory controller, and a second memory controller and
wherein the first interface is included in the first memory controller for controlling one or more volatile memories and the second interface is included in the second memory controller controlling one or more non-volatile memories, and
whether the method further includes:
producing, by the data controller, a temperature monitoring result by monitoring a temperature of each of the first memory module and the second memory module using a thermal sensor that is included in each of the first memory module and the second memory module, and
throttling, by the data controller, the temperature of each of the first memory module and the second memory module based on the temperature monitoring result.

19. The method of claim 18, further comprising:
when the temperature monitoring result reveals that a temperature of the cache region in the first memory module is equal to or higher than a second threshold value, disabling, by the data controller, a use of the cache region.

20. The method of claim 18, further comprising:
when the temperature monitoring result reveals that a temperature of a first memory in the first memory module is equal to or higher than a second threshold value, using, by the data controller, the cache region as a data buffer of the first memory and storing, by the data controller, data stored in the first memory in the cache region.

21. The method of claim 18, further comprising:
when the monitoring result reveals that a temperature of the second memory in the second memory module is equal to or higher than a second threshold value, storing, by the data controller, write data of the second memory in the cache region.

22. The method of claim 17, further comprising:
monitoring powers of each of the first memory module and the second memory module by collecting data transaction information or monitoring a peak current.

23. The method of claim 22, wherein the monitoring of the power of each of the first memory module and the second memory module includes:
monitoring the power of each of the first memory module and the second memory module by monitoring at least one of data transaction and a peak current of each of the first memory module and the second memory module.

24. The method of claim 22, further comprising:
when the power monitoring result reveals that the power of the cache region in the first memory module is equal to or higher than the first threshold value, disabling a use of the cache region.

25. The method of claim 22, further comprising:
when the power monitoring result reveals that power of a first memory in the first memory module is equal to or higher than the first threshold value, using the cache region as a data buffer of the first memory and storing data stored in the first memory in the cache region.

26. The method of claim 17, wherein the cache region includes one physical memory that is selected from among memories in the first memory module.

27. The method of claim 17, wherein the cache region includes a logical memory that is formed of particular corresponding regions of memories in the first memory module.

28. The method of claim 17, wherein each of the first characteristics and the second characteristics include at least one of storage capacity and latency.

29. The method of claim 28, wherein the first memory module and the second memory module include Dynamic Random Access Memories (DRAMs) and Phase-Change Random Access Memories (PCRAMs), respectively.

30. The method of claim 28, wherein the first memory module and the second memory module include Phase-Change Random Access Memories (PCRAMs) and flash memories, respectively.

31. The method of claim 17, further comprising:
when the energy throttling operation is performed on the second memory in the second memory module, performing an operation of controlling data transaction into the second memory.

32. The method of claim 17, wherein the predetermined data includes hot data.

* * * * *